United States Patent [19]
Uejo et al.

[11] Patent Number: 5,926,579
[45] Date of Patent: *Jul. 20, 1999

[54] IMAGE PROCESSING APPARATUS CAPABLE OF PROPERLY DETERMINING DENSITY OF A BACKGROUND PORTION

[75] Inventors: Hiroyoshi Uejo; Yoshiyuki Hirayama, both of Kanagawa, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/561,557

[22] Filed: Nov. 21, 1995

Related U.S. Application Data

[63] Continuation of application No. 08/095,831, Jul. 22, 1993, abandoned.

[30] Foreign Application Priority Data

Jul. 23, 1992 [JP] Japan .................................. 4-196612

[51] Int. Cl.$^6$ ...................................... G06K 9/38
[52] U.S. Cl. ........................... 382/272; 358/466; 382/270
[58] Field of Search ..................... 382/270, 271, 382/272, 273, 172, 312, 274, 275; 358/466, 462–464

[56] References Cited

U.S. PATENT DOCUMENTS

| | | | |
|---|---|---|---|
| 4,520,280 | 5/1985 | Yoshikawa et al. | 382/50 |
| 4,562,486 | 12/1985 | Suzuki et al. | 382/50 |
| 4,710,822 | 12/1987 | Matsunawa | 382/51 |
| 4,850,029 | 7/1989 | Moyer et al. | 382/52 |
| 4,868,670 | 9/1989 | Morton et al. | 358/464 |
| 4,896,364 | 1/1990 | Lohscheller | 382/52 |
| 4,903,316 | 2/1990 | Hongo et al. | 382/272 |
| 4,908,875 | 3/1990 | Assael et al. | 382/52 |
| 4,975,768 | 12/1990 | Takaraga | 358/538 |
| 5,065,257 | 11/1991 | Yamada | 358/463 |
| 5,086,485 | 2/1992 | Lin | 382/51 |
| 5,138,671 | 8/1992 | Yokoyama | 382/52 |
| 5,153,925 | 10/1992 | Tanioka et al. | 382/52 |
| 5,157,740 | 10/1992 | Klein et al. | 358/466 |
| 5,159,471 | 10/1992 | Satou et al. | 358/466 |

FOREIGN PATENT DOCUMENTS

| | | |
|---|---|---|
| 57062665 | 4/1982 | European Pat. Off. . |
| 0 335 419 | 3/1989 | European Pat. Off. . |
| 2046051 | 11/1980 | United Kingdom . |
| 2080655 | 2/1982 | United Kingdom . |

OTHER PUBLICATIONS

English language translation of JP 3–68270. Mar. 25, 1991.

European Search Report Feb. 10, 1998.

European Search Report Feb. 10, 1998.

Communication from European Patent Office dated Dec. 1, 1993, including European Search Report dated Nov. 10, 1993.

Patent Abstracts of Japan, vol. 15, No. 233, Jun. 14, 1991.

Patent Abstracts of Japan, vol. 15, No. 438, Nov. 8, 1991.

Patent Abstracts of Japan, vol. 8, No. 206, Sep. 20, 1984.

*Primary Examiner*—Leo H. Boudreau
*Assistant Examiner*—Bhavesh Mehta
*Attorney, Agent, or Firm*—Finnegan, Henderson, Farabow, Garrett & Dunner, L.L.P.

[57] ABSTRACT

Density data produced by an image reading unit is input to a surface density detection unit, which detects a surface density by averaging density data of pixels within a predetermined density range. A period setting unit sets a period of sampling density data of pixels to be used for calculation of the surface density. A surface reference density generation unit generates a surface reference density by adding an offset to the detected surface density. A surface color elimination unit corrects density data of a pixel lower than the surface reference density to the white level to eliminate a surface color.

9 Claims, 27 Drawing Sheets

IMAGE PROCESSING APPARATUS CAPABLE OF PROPERLY DETERMINING DENSITY OF A BACKGROUND PORTION

This application is a continuation, of application Ser. No. 08/095,831 filed Jul. 22, 1993, now abandoned.

BACKGROUND OF THE INVENTION

The present invention relates to image processing apparatuses such as a copier, facsimile machine and printer. More specifically, the invention relates to an image processing apparatus which recognizes surface (or background) portions (i.e., portions other than character portions, figure portions, etc.) of a document and fixes their density to a preset surface density.

In general, in reading an image of a document and recording it or displaying it on a display unit, it is preferable that surface portions be expressed consistently as white portions rather than expressed using their actual densities. For the same reason, for instance in the photography art, copies are produced by applying a yellow filter to an old photograph having yellow, discolored patches to thereby converting its surface color to white.

Similarly, in image processing apparatuses such as a copier, if, for instance, a diazo document is recorded while its surface portions are read in a consistent manner, unevenness in density or stained background portions become conspicuous, making necessary information-bearing portions such as character portions less legible. Conventionally, to solve this problem, there has been proposed an image processing apparatus having a surface color elimination device which detects the density level of surface portions and eliminates density data and consistently uses white data for the surface portions.

FIG. 48 shows the conceptual constitution of the above type of image processing apparatus as described in Japanese Patent Application Unexamined Publication No. Hei. 3-68270. In this apparatus, an image reading means 102 reads a document 101 to produce image data 103. The image data 103 is input to a surface density detection means 104, which detects a document surface density by averaging, for each scanning line, the density data 103 of pixels having a density within a predetermined density range. In this operation, sampling is performed every four pixels. The averaging is performed on sampled pixels of a predetermined number (e.g., four). Therefore, the averaging cannot be performed at the beginning portion of each scanning line, where four pixels have not been obtained. At the beginning portion of each scanning line, a preset initial elimination level is used instead of performing the averaging.

Then, a surface reference density generation means 106 generates a surface reference density by adding an offset, which is set by an offset setting means 105, to the above averaged density data. The generated surface reference density is input to a surface color elimination means 107. The surface color elimination means 107 eliminates surface portions whose density is smaller than the surface reference density from the density data 103 that is output from the image reading means 102, and supplies the remaining portions of the density data 103 to an image forming means 108 to enable it to print out an image.

In the above image processing apparatus, since the surface reference density is generated in accordance with the detected surface density, the surface portions can be eliminated by discriminating them from the other portions when the surface density increases or decreases gently, in which case the surface reference density varies accordingly. However, in the case of diazo documents, newspapers, etc. having a high surface density, the surface density exceeds the predetermined density range of the surface density detection means 104, so that the surface portions are output as they are, that is, with the surface color not corrected to white.

To avoid such a problem, it may be conceivable to set the a wider density range for calculation of the surface density. In this case, however, the surface reference density becomes much higher, because pixels having a higher density are also subjected to the averaging operation and the offset setting means 105 adds the offset to the thus averaged surface density. For example, in a case of reading a straight line written on a square sheet of fancy paper with a pencil and extending in the main scanning direction, a problem occurs because the straight line is not output from a certain position. This problems occurs because at the beginning portion the surface reference density is still relatively low and the pencil-written line is read as an image portion, in the meantime the pencil-written line is subjected to the averaging operation, and finally a further increase of the surface reference density causes the pencil-written line to be recognized as a surface portion.

As shown in FIG. 15, in a certain kind of image processing apparatus, the processing speed is increased by performing processing for each of several blocks produced by dividing an image in the main scanning direction. That is, the processing on a scanning line is performed on a block-by-block basis. Where one scanning line is divided into six sections belonging to respective blocks as in the case of FIG. 15, the initial elimination levels are set at six points on the original scanning line. Therefore, if the initial elimination level is too high or too low, the surface detection is not performed in the normal way to cause problems; for instance, an image portion disappears or, conversely, a surface portion is output.

Furthermore, in conventional apparatuses, the image sampling is performed with a fixed density range and at a fixed sampling period. Therefore, a low-contrast image written on a high-density surface (such as in the above example) will disappear if the response speed is fast enough to sample every pixel, in which case the surface density detection follows the density variation. On the other hand, if the response speed is lowered so as not to respond to a quick-varying surface density, the corresponding surface portion will be output.

Referring to FIG. 49, the problem associated with the fast response speed is described in a specific manner. FIG. 49 shows a variation of density data 111 whose level exists between an absolute white level and an absolute black level. The absolute white level means a lowest level (a highest degree of white) of densities that can be regarded as a surface density, and the absolute black level means a highest level (a highest degree of black) of the densities that can be regarded as a surface density. In FIG. 49, an offset is represented by α. Where the surface reference density has a fast response speed, a surface reference density 112 indicated by a dashed line is higher than density data 111 at any point, i.e., even at slightly high density portion 111A of the density data 111. As a result, even if the high density portion 111A is an image portion, it is judged to be a surface portion. That is, all the density data 111 is fixed to the white level and the image portion disappears.

Referring to an example of FIG. 50, the problem associated with the slow response speed is described in a specific manner. A surface reference density 113 indicated by a chained line exhibits almost no variation even at a slightly high density portion 111A of density data 111. As a result, only the portions below the surface reference density 113 are eliminated as surface portions. Even if the high density portion 111A is part of a surface portion, it is erroneously output as an image portion.

SUMMARY OF THE INVENTION

A first object of the present invention is to provide an image processing apparatus that is externally adjusted so that a surface portion and an image portion can be separated satisfactorily for various types of documents.

A second object of the invention is to provide an automatic image processing apparatus which can satisfactorily separate a surface portion and an image portion for various types of documents.

A third object of the invention is to provide an image processing apparatus of the type in which image data of one scanning line is divided into a plurality of blocks, which apparatus can prevent intermittence of an image portion and an erroneous output of a surface portion at a boundary between the adjacent blocks.

According to the invention, an image processing apparatus comprises:

means for setting a pixel density range;

means for reading a document along scanning lines to produce serial density data of pixels;

means for extracting density data of pixels for surface color detection that are within the density range from the produced density data of pixels;

means for sampling part of the density data of pixels for surface color detection;

means for changing a sampling period of the sampling means within a predetermined period range;

means for calculating a surface reference density based on the sampled part of the density data of pixels for surface color detection; and means for replacing a density of a pixel that is lower than the surface reference density with a predetermined surface density.

According to another aspect of the invention, an image processing apparatus comprises:

means for setting a plurality of pixel density ranges;

means for reading a document along scanning lines to produce serial density data of pixels;

means for extracting density data of pixels for surface color detection that are within the respective density ranges from the produced density data of pixels, and for counting, for the respective density ranges, numbers of the extracted density data of pixels;

means for selecting one of the density ranges that is associated with a maximum counting number;

means for sampling part of the density data of pixels for surface color detection that are within the selected density range;

means for calculating a surface reference density based on the sampled part of the density data of pixels for surface color detection; and means for replacing a density of a pixel that is lower than the surface reference density with a predetermined surface density.

DESCRIPTION OF THE PREFERRED EMBODIMENTS

Figure 2:
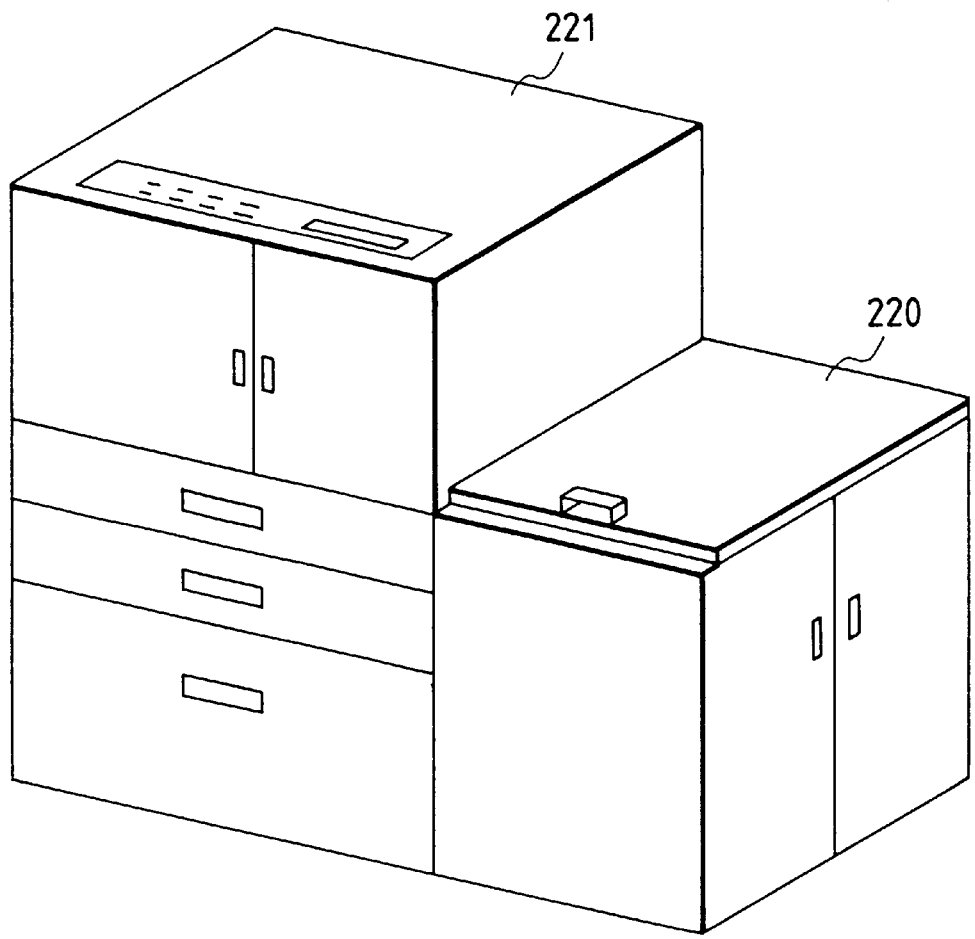
FIG. 2 is a perspective view showing appearance of the digital copier having a self-diagnostic system of the embodiment of FIG. 1.
Figure 3:
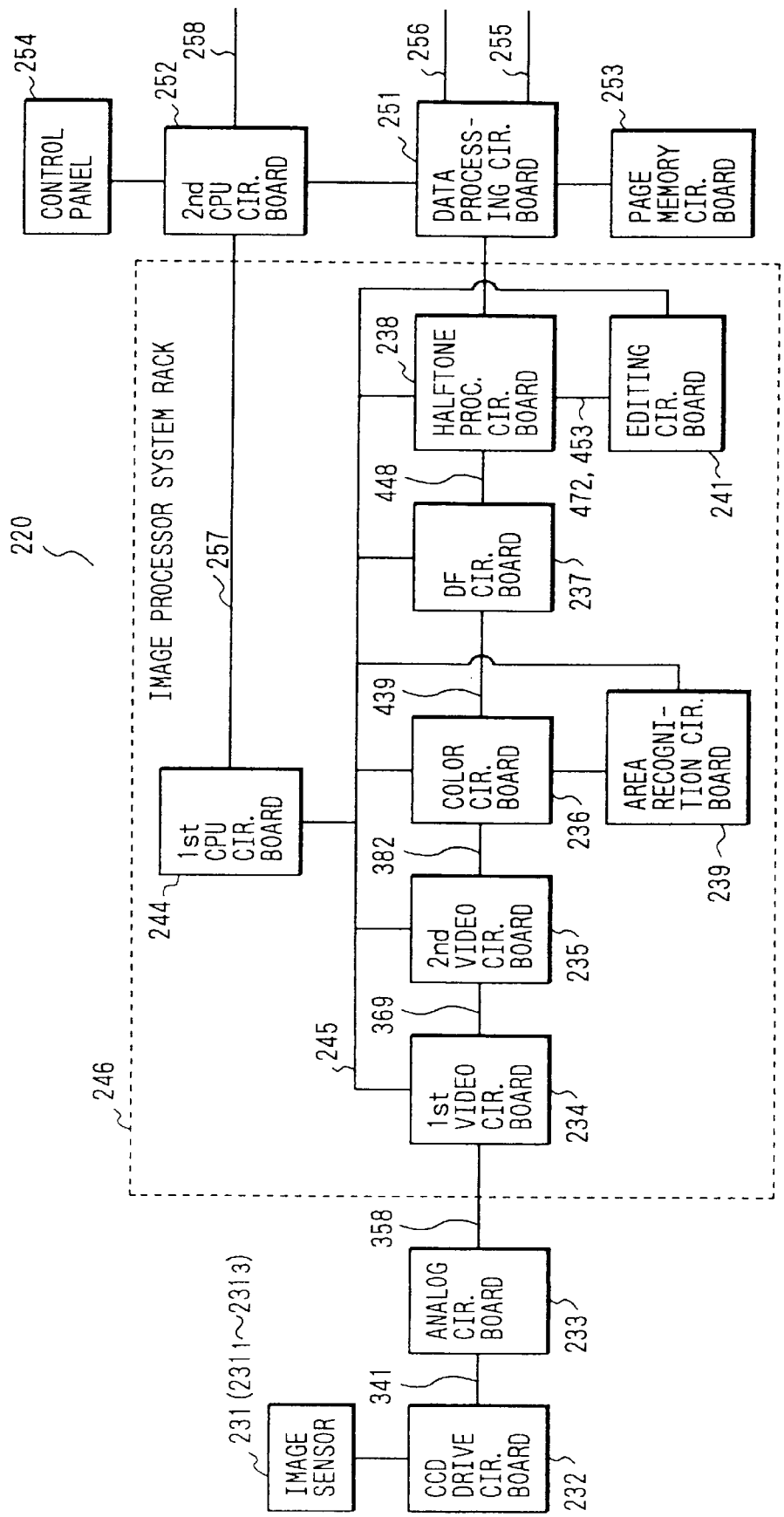
FIG. 3 is a block diagram showing constitution of an image scanner section of the embodiment of FIG. 2.

The present invention is hereinafter described in detail by way of embodiments.
Outline of Digital Copier FIG. 2 shows appearance of a digital copier as an image processing apparatus according to a first embodiment of the invention. This digital copier consists of an image scanner section 220 which reads a document (not shown) with a full-color image sensor and has a page memory for storing image data produced by various image processing and editing operations, and a printing section 221 which performs two-color printing based on the image data stored in the image scanner section 220. The image scanner section 220 has a control panel which allows a user to specify the number of copies, various image processing and editing functions, etc. Copies can be obtained in a desired manner by inputting instructions through the control panel.
Constitution of Image Scanner Section FIG. 3 shows constitution of the image scanner section 220. The image scanner section 220 has an image sensor 231 using a charge coupled device (hereinafter abbreviated as CCD). The image sensor is mounted on a CCD drive circuit board 232. An analog circuit board 233, first video circuit board 234, second video circuit board 235, color circuit board 236, digital filter circuit board (DF circuit board) 237 and halftone processing circuit board 238 are provided downstream of the CCD drive circuit board 232. An area recognition circuit board 239 is connected to the color circuit board 236, and an editing circuit board 241 for image edition is connected to the halftone processing circuit board 238.

The circuit boards from the first video circuit board 234 to the halftone processing circuit board 238, the area recognition circuit board 239, the editing circuit board 241, and a first CPU circuit board 244 for controlling those circuit boards are connected to each other via a VME bus 245, which is a bus according to one of system bus standards. The above circuit boards are accommodated in an image processor system (IPS) rack 246.

A data processing circuit board 251 is provided downstream of the halftone processing circuit board 238 that is located at the end of the image processor system rack 246. A second CPU circuit board 252 and a page memory circuit board 253 on which a page memory is mounted are connected to the data processing circuit board 251. A control panel 254 for operations by an operator (mentioned above) is connected to the second CPU circuit board 252. The data processing circuit board 251 supplied processed image data 255 to the printing section 221 (see FIG. 2), and receives a control signal 256 from it. Further, the second CPU circuit board 252 is connected to the first CPU circuit board 244 via a control data line 257, and to a control unit (described later) of the printing section 221 via a control data line 258.

Figure 4:
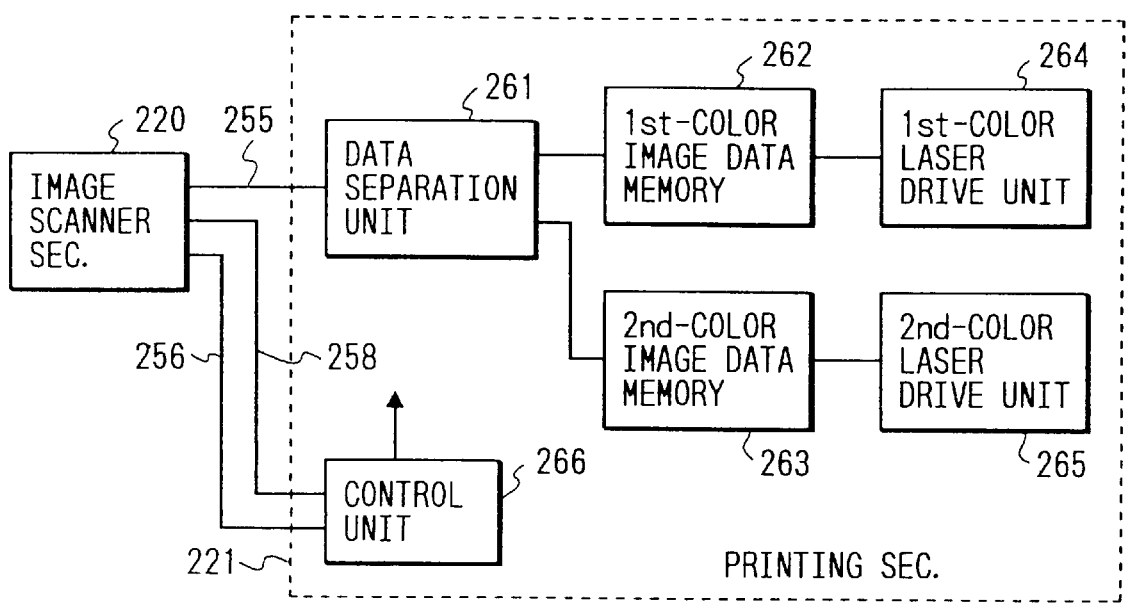
FIG. 4 is a block diagram showing specific constitution of a printing section of the embodiment of FIG. 1.

FIG. 4 shows specific construction of the printing section 221. The printing section 221 has a data separation unit 261 which receives the image data 255 from the image scanner section 220. A first-color image data memory 262 and a second-color image data memory 263 for respectively storing first-color and second-color image data are provided downstream of the data separation unit 261. A first-color laser drive unit 264 and a second-color laser drive unit 265 for driving lasers of the respective colors are provided downstream of the first-color image data memory 262 and the second-color image data memory 263, respectively. A control unit 266 is connected to the second CPU circuit board 252 (see FIG. 3) of the image scanner section 220 via the control data line 258, and sends the control signal 256 to the data processing circuit board 251 (see FIG. 3) of the image scanner section 220.

Figure 5:
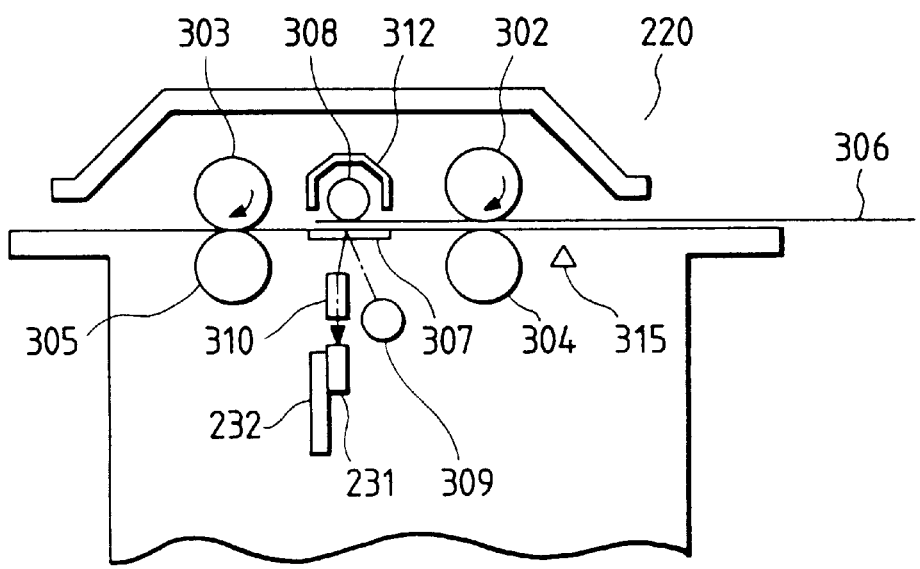
FIG. 5 schematically shows a document reading portion of the image scanner section of FIG. 3.

FIG. 5 shows a general mechanical structure of the image scanner section 220 of FIG. 3. The image scanner section 220 has document feeding rollers 302 and 303 provided above a document feeding path at a predetermined interval, and rollers 304 and 305 provided below the document feeding path at locations corresponding to the rollers 302 and 303, respectively. A document 306 is sandwiched between the rollers 302–305, and thereby conveyed leftward in FIG. 5. A platen glass 307 is provided approximately at the center of the document feeding path, and a platen roller 308 is in contact, from above, with the platen glass 307.

A light source 309 for illuminating the reading positions of the document 306 and a converging rod lens array 310 for focusing reflection light from the document 306 onto the image sensor 231 are disposed below the platen glass 307. The image sensor 231 is mounted on the CCD drive circuit board 232 (see FIG. 3). A sensor 315 for detecting insertion of the document 306 is provided in a document inserting portion of the image scanner section 220. Further, the platen roller 308 is covered with a reference plate 312 having a plurality of flat faces and rotatable about the central axis of the platen roller 308.

Figure 6:
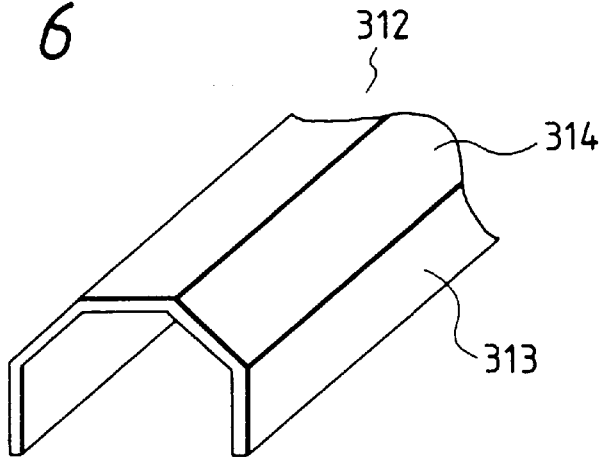
FIG. 6 is a perspective view of part of a reference plate shown in FIG. 5.

FIG. 6 shows a configuration of the reference plate 312, which has a black face 313 and a white face 314 serving as references of the black and white levels, respectively used in the image reading operation. The black face 313 and the white face 314 can selectively be inserted between the platen glass 307 and the platen roller 308.

Figure 7:
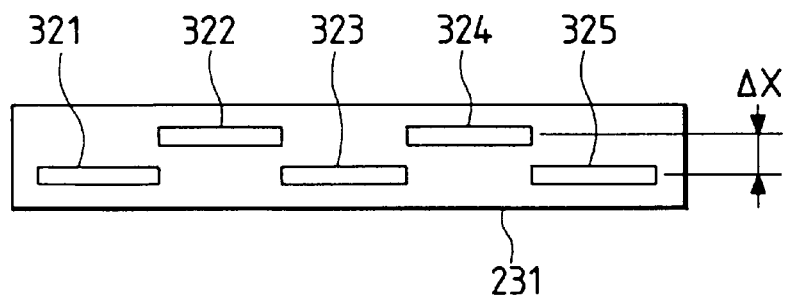
FIG. 7 is a plan view showing an arrangement of image sensor chips used.

FIG. 7 shows an arrangement of sensor chips in the image sensor 231. In this embodiment, the image sensor 231 is of a full-color, contact-type and has first to fifth staggered line sensor chips 321–325.

In this embodiment, the sensor chips 321–325 are arranged so as not to cause intermittence of the image reading in the main scanning direction at their boundaries. The first, third and fifth sensor chips 321, 323 and 325 are spaced, by Δx, from the second and fourth sensor chips 322 and 324 in the direction perpendicular to the main scanning direction. A process of converting the image data as produced by the five line sensor chips 321–325 to image data as would be obtained by reading a single line on the document 306 (see FIG. 5) is performed by a circuit in the first video circuit board 234.

Figure 8:
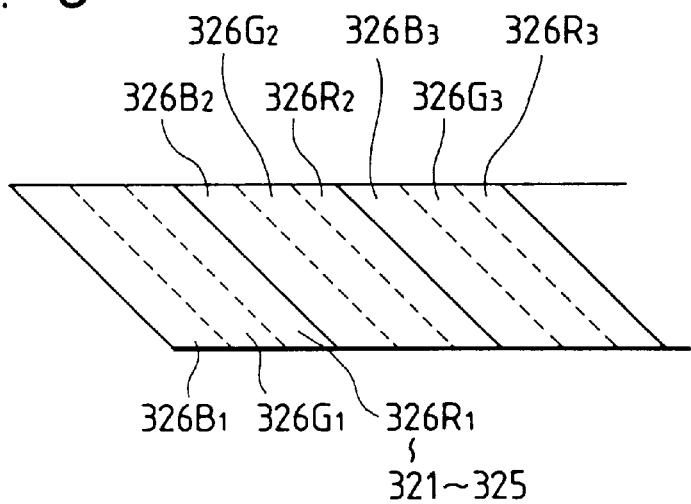
FIG. 8 is a plan view showing a pixel arrangement in the image sensor chip used.

FIG. 8 shows an arrangement of pixels in each chip of the image sensor 231. To realize full-color reading, in each of the first to fifth line sensor chips 321–325 (see FIG. 7), pixels 326B for reading blue image data, pixels 326G for reading green image data and pixels 326R for reading red image data are arranged repetitively in this order.

First CPU Circuit Board

Figure 9:
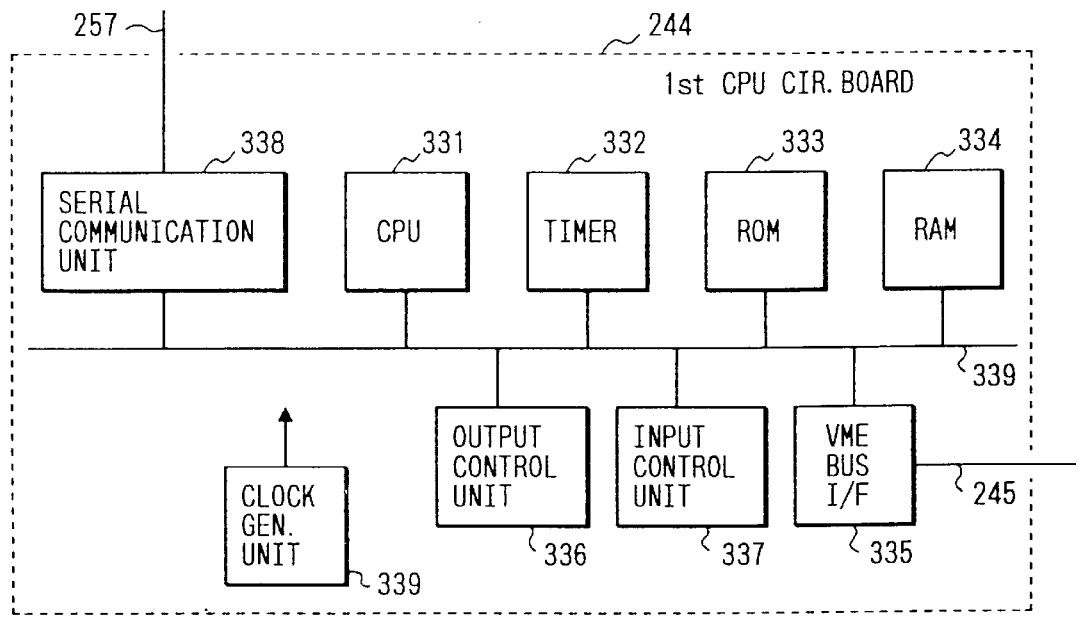
FIG. 9 is a block diagram showing specific constitution of a first CPU circuit board.

FIG. 9 shows specific constitution of the first CPU circuit board 244. The first CPU board 244 has a CPU 331, timer 332, ROM 333, RAM 334, VME bus interface (VME bus I/F) 335, output control unit 336, input control unit 337 and serial communication unit 338, which are connected to each other via a bus 339. The VME bus I/F 335 is connected to the VME bus 245 (see FIG. 3), and the serial communication unit 338 is connected to the control data line 257 (see FIG. 3). The first CPU circuit board 244 controls the respective circuit boards of the image processor rack 246 and communicates with the second CPU circuit board 252 (see FIG. 3) by executing programs stored in the ROM 333 using the RAM 334 as working areas. The first CPU circuit board 244 also includes a clock generation unit 340 for supplying a clock signal to the respective units.

In the image scanner section shown in FIG. 3, when a user specifies the number of necessary copies, various image processing and editing functions, etc. through the control panel 254, a CPU of the second CPU circuit board 252 sends information on the specified image processing and editing functions to the CPU 331 of the first CPU circuit board 244 via the control data line 257. Further, the CPU of the second CPU circuit board 252 sends information on a paper size etc. selected through the control panel 254 to the control unit 266 of the printing section 221 via the control data line 258 (see FIG. 4).

The first CPU circuit board 244 (see FIG. 9) receives the information on the various image processing and editing functions via the control data line 257 and the CPU 331 interprets that information. The CPU 331 sends various parameters (control data) corresponding to the image processing and editing information to proper registers and RAMs in the respective circuit boards 234–241 of the image processor system rack 246 via the VME bus I/F 335 and the VME bus 245 (see FIG. 3), and sets those parameters in the registers and RAMs.

When the operator inserts the document 306 into the image scanner section 220 (see FIG. 5), the sensor 315 is turned on, which is detected by the CPU 331 via the input control unit 337 of the first CPU circuit board 244 (FIG. 9). Then, the CPU 331 drives a document feeding motor (not shown), so that the document 306 is conveyed by the document feeding rollers 302 and 303. When the document reaches the platen roller 308, the document 306 is illuminated with the light emitted from the light source 309, and the reflection light impinges on the image sensor 231. In this state, the document 306 is read with the image sensor 231 being driven by the CCD drive circuit board 232 (see FIG. 3), and a CCD video signal 341 is sequentially processed by the analog circuit board 233.

Analog Circuit Board

Figure 10:
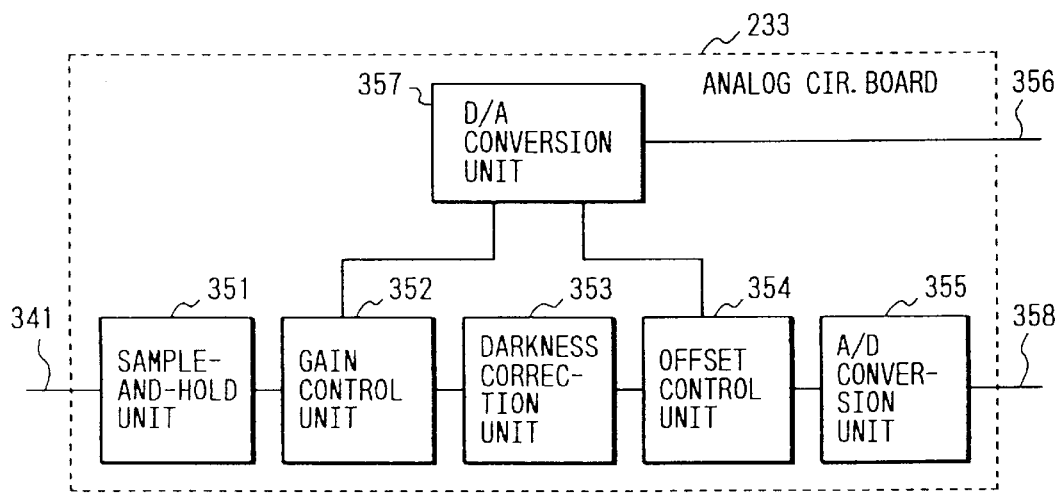
FIG. 10 is a block diagram showing specific constitution of an analog circuit board.

FIG. 10 shows specific constitution of the analog circuit board 233 of FIG. 3. A sample-and-hold unit 351 receives the CCD video signal 341 from the CCD drive circuit board 232 (see FIG. 3), and extracts the effective image signal from it. A gain control unit 352, darkness correction unit 353, offset control unit 354 and A/D conversion unit 355 are provided downstream of the sample-and-hold unit 351. A D/A conversion unit 357 D/A-converts data 356 sent from the first video circuit board 234 (see FIG. 3), and sets the gain control unit 352 and the offset control unit 354 based on the converted data. Image data 358 output from the A/D conversion unit 355 is input to the image processor system rack 246 (see FIG. 3).

In this digital copier, prior to the reading of the document 306 and when the image scanner section 220 (see FIG. 5) is in a power-on state, the black face 313 of the reference plate 312 (see FIG. 6) is placed on the platen glass 307 and read by the image sensor 231. The D/A conversion unit 357 is controlled by the CPU 331 so as to automatically set an offset of the offset control unit 354 (see FIG. 10) so that a reading value of the black face 313 takes a predetermined value (automatic offset control (AOC)).

Then, the white face 314 of the reference plate 312 (see FIG. 6) is placed on the platen glass, and read by the image sensor 231. The D/A conversion unit 357 is controlled by the CPU 331 so as to automatically set a gain of the gain control unit 352 so that a reading value of the white face 313 takes a predetermined value (automatic gain control (AGC)).

With the above pre-adjustments, the actual reading data of the document 306 becomes video data which does not saturate and has a sufficiently wide dynamic range, digitized by the A/D conversion unit 355, and then sent to the first video circuit board 234 (see FIG. 3) as the image data 358. The darkness correction unit 353 removes an output variation component of the image sensor 231 as would otherwise be caused by a dark current, using an output signal of shield bits (shield pixels).

First Video Circuit Board

Figure 11:
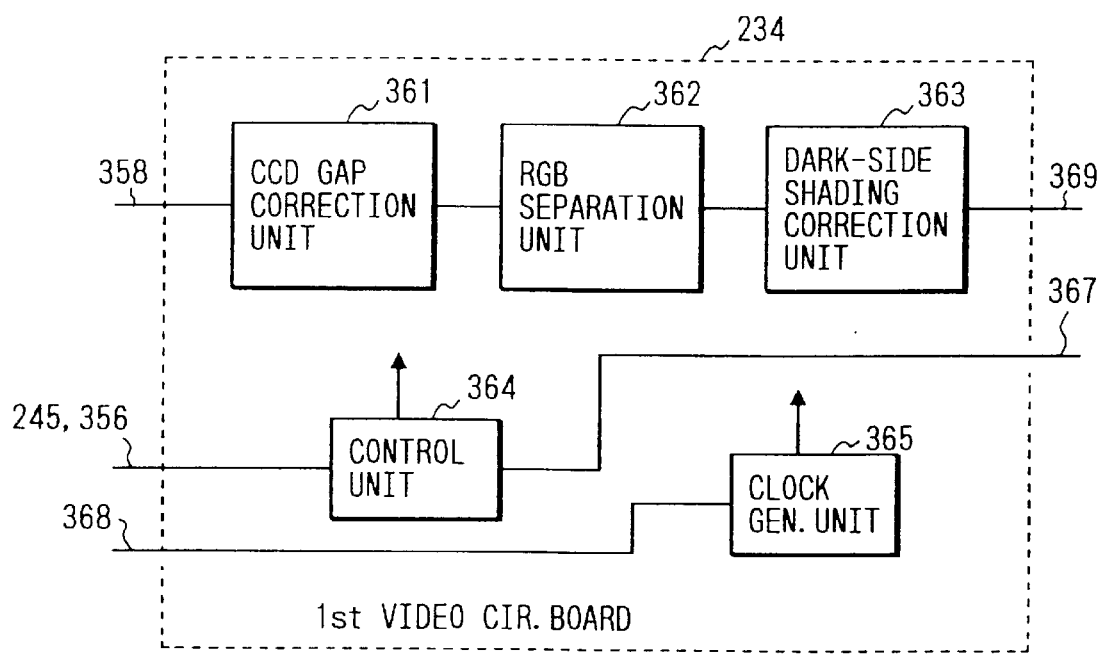
FIG. 11 is a block diagram showing specific constitution of a first video circuit board.

FIG. 11 shows specific constitution of the first video circuit board 234 of FIG. 3. The first video circuit board 234 has a CCD gap correction unit 361 which receives the image data 358 from the analog circuit board 233 (see FIG. 3) and performs a correction in connection with the gap between the first to fifth line sensor chips 321–325. A RGB separation unit 362 and a dark-side shading correction unit 363 are provided in this order downstream of the CCD gap correction unit 361. The first video circuit board 234 further has a control unit 364 for controlling the above units 361–363, and a clock generation circuit 365 for supplying a clock signal to those units.

Via the VME bus 245, the control unit 364 sends the data 356 to the analog circuit board 233 (see FIG. 10), and a control signal 367 to the second video circuit board 235 (see FIG. 3). The clock generation circuit 365 supplies the analog circuit board 233 with a drive clock signal 368, which is sent to the CCD drive circuit board 232 (see FIG. 3) via the analog circuit board 233.

As described above, in this embodiment the image sensor 231 consists of five sensor chips 321–325 that are staggered as shown in FIG. 7, in which two chip groups are spaced from each other by the gap Δx. The CCD gap correction unit 361 converts the data as produced by the five sensor chips 321–325 to data as would be obtained by reading a single line on the document 306. Specifically, the CCD gap correction unit 361 delays the data produced by the second and fourth sensor chips 322 and 324 by use of memories to obtain the data corresponding to a single line.

Figure 12:
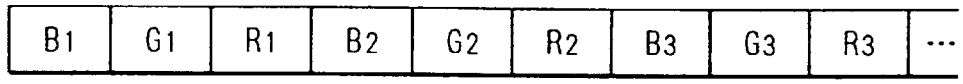
FIG. 12 illustrates an image data sequence output from a CCD gap correction unit.

FIG. 12 shows an image data sequence that is output from the CCD gap correction unit 361. If the image data that are output from the pixels 326B, 326G and 326R are written as $B_1, G_1, R_1, B_2, G_2, R_2, \ldots, B_N, G_N, R_N$, respectively, they are repeated in the order of B (blue), G (green) and R (red) as shown in FIG. 12.

Figure 13A:
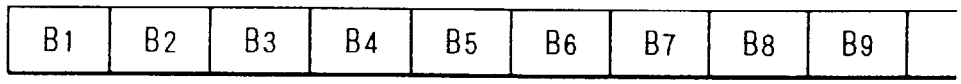
FIGS. 13(a)–13(c) illustrate outputs of a RGB separation unit.
Figure 13B:
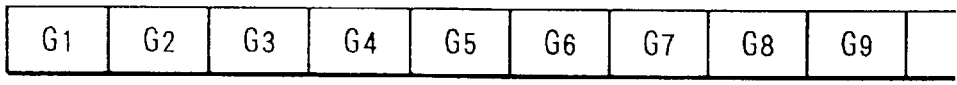
Figure 13C:
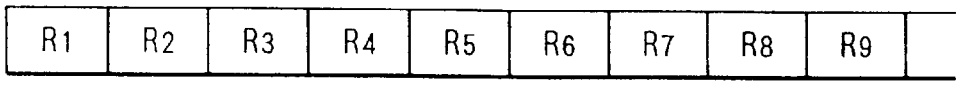

On the other hand, FIGS. 13(a)–13(c) show outputs of the RGB separation unit 362. FIG. 13(a)–13(c) respectively show a blue image data sequence, a green image data sequence and a red image data sequence. In this manner, the RGB separation circuit 362 converts the serial image data of B, G and R (see FIG. 12) to the respective image data sequences of B, G and R.

The image data thus separated for B, G and R are sent to the dark-side shading correction unit 363 (see FIG. 11), where they are subjected to dark-side shading correction as described below. That is, prior to the reading of the document 306 and after the automatic offset control and automatic gain control operations performed when the image scanner section 220 (see FIG. 5) is in a power-on state, the image data produced by reading the black face 313 is stored in a built-in memory on a pixel-by-pixel basis, and is subtracted from the image data of the respective pixels produced by reading the actual document 306. Image data 369 sequentially obtained by the above process of the first video circuit board 234 is sent to the second video circuit board 235.

Second Video Circuit Board

Figure 14:
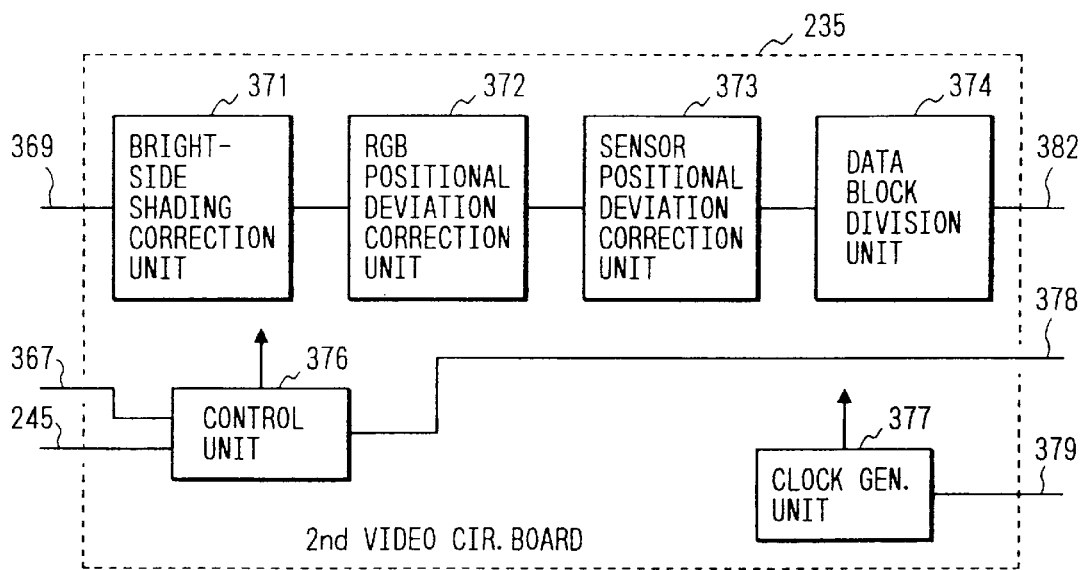
FIG. 14 is a block diagram showing specific constitution of a second video circuit board.

FIG. 14 shows specific constitution of the second video circuit board 235. The second video circuit board 235 has a bright-side shading correction unit 371 which receives the image data 369 from the first video circuit board 234 (see FIG. 3). There are provided, in the following order, downstream of the bright-side shading correction unit 371 a RGB positional deviation correction unit 372, a sensor positional deviation correction unit 373, a data block division unit 374, a control unit 376 for controlling the above units 371–374, and a clock generation unit 377 for supplying a clock signal to those units 371–374. The control unit 376 is connected to the VME bus 245. Further, the control unit 376 receives the control signal 367 from the first video circuit board 234 (FIG. 3), and supplies a control signal 378 to the color circuit board 236. The clock generation unit 377 supplies a control clock signal 379 to the respective circuit boards downstream thereof.

The image data 369 input to the second video circuit board 235 is first subjected to the bright-side shading correction in the bright-side shading correction unit 371. The bright-side shading correction is performed in a manner similar to the case of the dark-side shading correction. That is, after the automatic offset control and automatic gain control operations, the image data produced by reading the white face 314 is stored in a memory on a pixel-by-pixel basis, and the image data produced by reading the actual document 306 is divided (i.e., normalized) on a pixel-by-pixel basis by the image data stored in the memory.

After being subjected to the dark-side and bright-side shading corrections, the image data is free from the influence of the brightness distribution of the light source 309 (see FIG. 5) and the sensitivity variation of the respective pixels of the image sensor 231. The CPU 331 (see FIG. 9) can control the automatic offset control, automatic gain control and dark-side and bright-side shading corrections, because it can set the offset of the automatic offset control and the gain of the automatic gain control, and can write to and read from the respective memories of the dark-side shading correction unit 363 and the bright-side shading correction unit 371 via the VME bus 245.

In the image sensor 231 (see FIG. 3) used in this embodiment, since the pixels 326B, 326G and 326R are arranged in this order in the main scanning direction as shown in FIG. 8, the actual document reading positions of B, G and R are deviated from each other, which would cause an erroneous determination when the color is determined in the color circuit board 236 provided in the next stage. Therefore, a process of correcting the reading positions of B, G and R to a single imaginary position is required. This correction is performed by the RGB positional deviation correction unit 372 in the following manner. For example, if the position of the pixel $326G_2$ is employed as a reference, imaginary B data and imaginary R data at that position are calculated from image data of the pixels $326B_2$ and $326B_3$ and image data of the pixels $326R_1$ and $326R_2$, respectively.

While the above description of the operation is made as if there existed only one image sensor 231, actually there are provided three image sensors $231_1$, $231_2$ and $231_3$ to enable reading of wide documents. Although the three image sensors $231_1$, $231_2$ and $231_3$ are mounted with an adjustment to enable reading of the same line (i.e., the same position in the sub-scanning direction) on the document 306, actually they deviate from each other to some extent in the sub-scanning direction. This deviation is corrected by the sensor positional deviation correction unit 373 based on a technique similar to the case of the CCD gap correction. That is, the image data of the respective sensors $231_1$, $231_2$ and $231_3$ are delayed using memories so as to be properly connected to each other in the main scanning direction.

While high-speed digital copiers capable of reading wide documents are required to process the image data at high speed, there exist certain limits of the operation speed of RAMs, digital ICs, etc. Considering this fact, in this embodiment the output image data of the sensor positional deviation correction unit 373 is divided into a plurality of blocks in the main scanning direction by the data block division unit 374.

Figure 15:
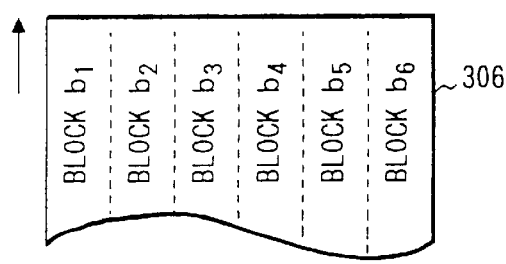
FIG. 15 illustrates division of output image data in the main scanning direction.

FIG. 15 illustrates how the output image data is divided in the main scanning direction. For example, as shown in FIG. 15, the output image data of one image sensor 231 is divided into two blocks; that is, the reading data of the document 306 is divided into a total of six blocks $b_1$–$b_6$. In the subsequent stage, the blocks $b_1$–$b_6$ are processed in a parallel manner. Image data 382 as divided into the six blocks $b_1$–$b_6$ is sent to the color circuit board 236.

Color Circuit Board

Figure 16:
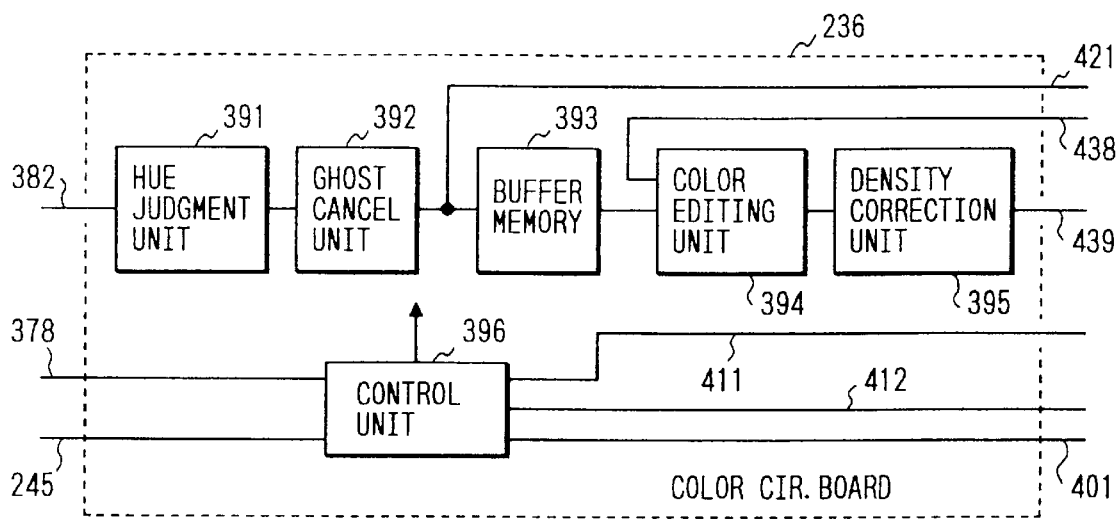
FIG. 16 is a block diagram showing specific constitution of a color circuit board.

FIG. 16 shows specific constitution of the color circuit board 236. The color circuit board 236 has a hue judgment unit 391 for receiving the image data 382 from the second video circuit board 235 (see FIG. 3). A ghost cancel unit 392, buffer memory 393, color editing unit 394 and density correction unit 395 are provided in this order downstream of the hue judgment unit 391. A control unit 396 controls the above respective units 391–395. The control unit 396 is connected to the VME bus 245. Furthermore, the control unit 396 receives the control signal 378 from the second video circuit board 235 (see FIG. 14) and a control signal 401 from the area recognition circuit board 239 (see FIG. 3), and supplies control signals 411 and 412 to the digital filter circuit board 237 (see FIG. 3) and the area recognition circuit board 239, respectively.

The image data 382 is input to the color circuit board 236 in the form of color image signals of R, G and B. The hue judgment unit 391 determines the color of an image on the document 306, and generates a color code signal (coded signal) and density data. The subsequent ghost cancel unit 392 corrects the color code signal generated by the hue judgment unit 391. It may be the case that as a result of the RGB positional deviation correction in the second video circuit board 235 (see FIG. 3), an erroneous color determination occurs, for instance, at an edge of a black image on the document 306 to cause generation of a color code not representing an achromatic color. The ghost cancel unit 392 corrects such a color code (i.e., a ghost) generated as a result of erroneous color judgment to one representing an achromatic color. Variation patterns of color codes in the occurrence of ghosts are known, and when one of those variation patterns is met a color code is corrected to one representing an achromatic color.

The density data and a color code signal 421, which have been generated in the above manner, are sequentially stored into the buffer memory 393. The color code signal 421 output from the ghost cancel unit 392 is also sent to the area recognition circuit board 239 (see FIG. 3). In this embodiment, various editing operations can be performed on a real-time basis on an area enclosed by a marker written on the document 306 with a marker pen. The area recognition circuit board 239 detects the area enclosed by the marker.

A description of the area recognition circuit board 239 is inserted below, and the remaining description of the color circuit board 236 follows it.

Area Recognition Circuit Board

Figure 17:
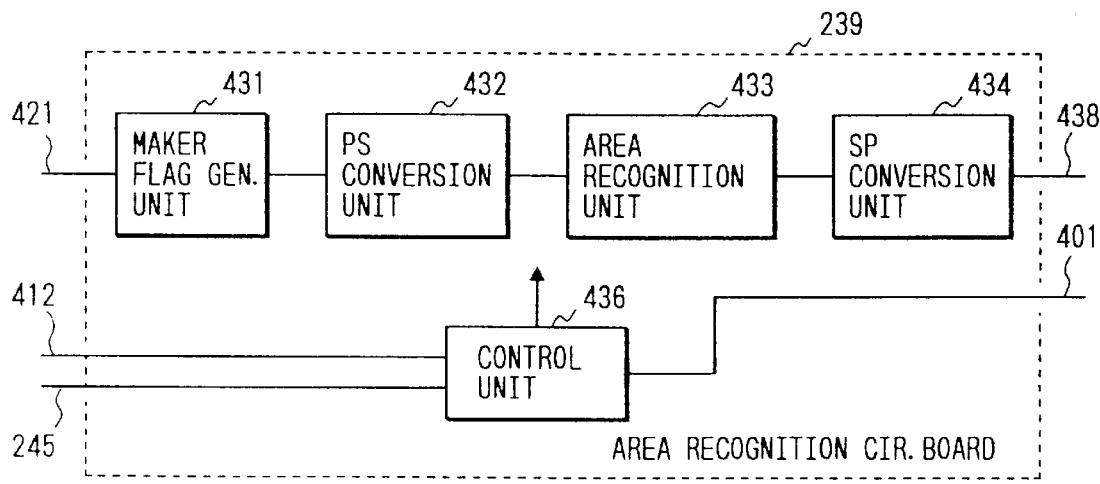
FIG. 17 is a block diagram showing specific constitution of an area recognition circuit board.

FIG. 17 shows specific constitution of the area recognition circuit board 239. The area recognition circuit board 239 has a marker flag generation unit 431 for receiving the color code signal 421 from the color circuit board 236 (see FIG. 16). A parallel-serial conversion (hereinafter abbreviated as PS conversion) unit 432, an area recognition unit 433 and a serial-parallel conversion (hereinafter abbreviated as SP conversion) unit 434 are provided in this order downstream of the marker flag generation unit 431. A controls unit 436 control the above respective units 431–434. The control unit 436 is connected to the VME bus 245. Further, the control unit 436 receives the control signal 412 from the color circuit board 236, and supplies the control signal 401 to the color circuit board 236.

The color code signal 421 sequentially sent from the color circuit board 236 is divided for the respective blocks. The marker flag generation unit 431 determines from the color code whether it has received a marker image. If the determination is affirmative, the marker flag generation unit 431 generates a marker flag. Then, the PS conversion unit 432 converts the block-divided marker flag to a one-line signal. The area recognition unit 433 recognizes an area enclosed by a marker based on the one-line marker flag thus obtained, and generates an area signal indicating the area. The area signal is again divided into respective blocks by the SP conversion unit 434, and is sequentially supplied, as an area signal 438, to the color editing unit 394 of the color circuit board 236 (see FIG. 16).

It takes a certain period of time for the area recognition circuit board 236 to recognize the area. The buffer memory 393 is provided in the color circuit board 239 to store the color code signal and the density data during this period until synchronization with the area signal 438 as output from the area recognition circuit board 239.

In this manner, the block-divided area signal 438 output from the area recognition circuit board 239 is input to the color editing unit 394. The control signal 401 output from the control unit 436 (see FIG. 17) is input to the control unit 396. In synchronism with the area signal 438, the control unit 396 allows the density data and the color code signal of a corresponding pixel to be read from the buffer memory 394 and input to the color editing unit 394.

The digital copier of this embodiment is a two-color copier, and can designate, by a sub-color flag, which of the two colors should be used to print a certain color on the document 306. Further, it is possible, for instance, to designate, by a drop-color flag, an image of a certain color on the document 306 as an image to be deleted. With these functions, for example, image data obtained by reading a marker itself is deleted tacitly, because it need not be reproduced. The function related to the two-color designation or the drop color may be effected only for an area specified by a marker or an area outside that area. Further, a BKG enable flag for on/off control of the surface color removal may be generated to designate whether the surface color removal in the next stage should be effected or not for an area inside or outside the specified area. These flags are generated by the color editing unit 394.

The thus-generated flags, the density data and the color code signal are sequentially forwarded to the density correction unit 395. The density correction unit 395 serves to change density data of a pixel that is associated with a drop color flag to white data (or delete it), and to perform independent density adjustment for each color (for each color code) on the document 306. Outputs 439 processed in the above manner including the sub-color flag, BKG enable flag, area signal, density data, etc. are sequentially sent to the digital filter circuit board 237 (see FIG. 3)

Digital Filter Circuit Board

Figure 18:
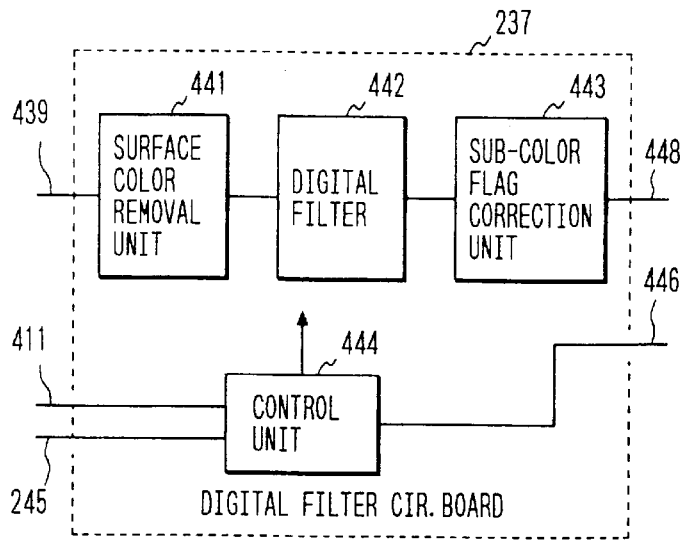
FIG. 18 is a block diagram showing specific constitution of a digital filter circuit board.

FIG. 18 shows specific constitution of the digital filter circuit board 237. The digital filter circuit board 237 has a surface color removal unit 441 for receiving the outputs 439 of the color circuit board 236 (see FIG. 16). A digital filter 442 and a sub-color flag correction unit 443 are provided in this order downstream of the surface color removal unit 441. A control unit 444 controls the above respective units 441–443, and is connected to the VME bus 245. The control unit 444 receives the control signal 411 from the color circuit board 236, and sends a control signal 446 to the halftone processing circuit board 238 (see FIG. 3).

In the digital filter circuit board 237, the surface color removal unit 441 sequentially changes image data of a surface portion in an area associated with a BKG enable flag to white data, and generates a BKG flag. The digital filter 442 performs edge emphasis and smoothing in accordance with the selected image mode. When the surface density is raised at an image edge portion by the smoothing operation, the sub-color flag correction unit 443 performs a correction of equalizing the sub-color flag of the surface-density-raised pixel to that of an image portion, to prevent, for instance, the occurrence of a black outline around a color character on the document 306. Outputs 448 processed in the above manner including the sub-color flag, density data, area flag, BKG flag, etc. are sequentially sent to the halftone processing circuit board 238 (see FIG. 3).

Halftone Processing Circuit Board

Figure 19:
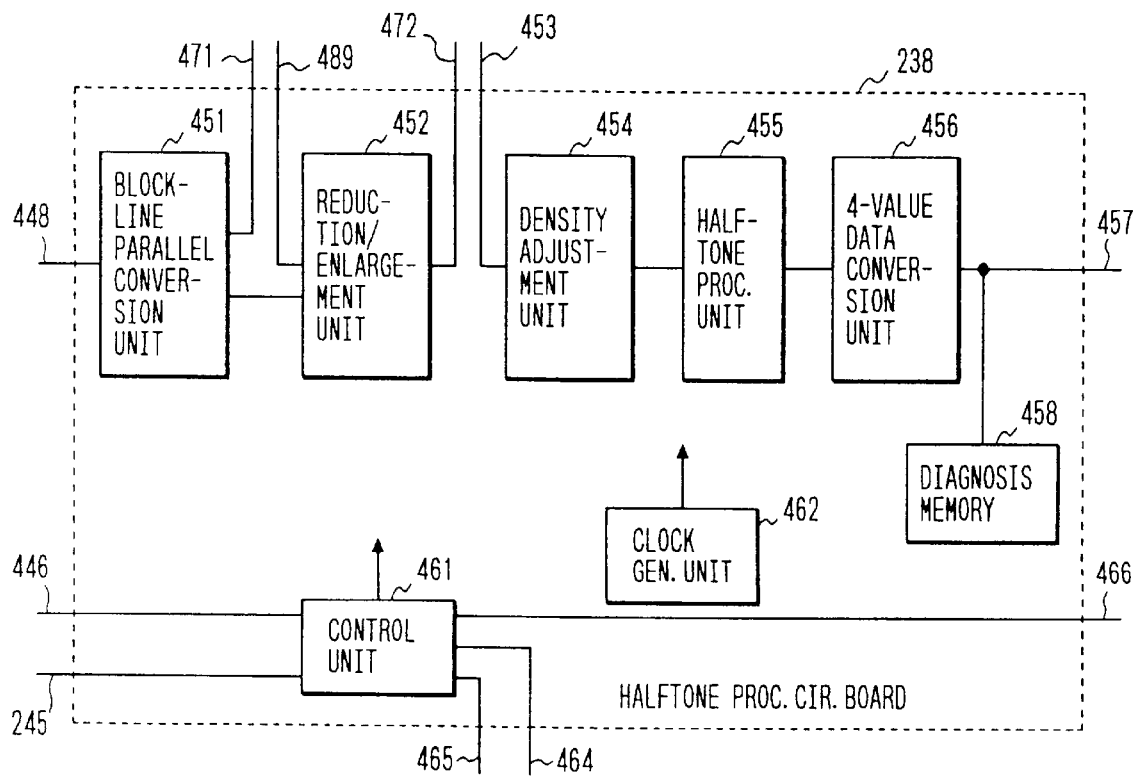
FIG. 19 is a block diagram showing specific constitution of a halftone processing circuit board.
Figure 20A:
FIGS. 20(a)–20(f) illustrate image data before conversion by a block-line parallel conversion unit.
Figure 20B:
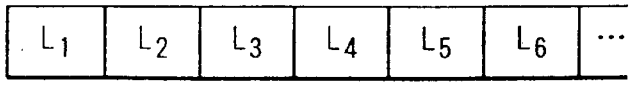
Figure 20C:
Figure 20D:
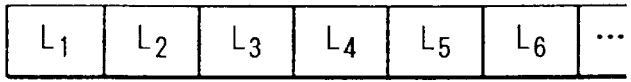
Figure 20E:
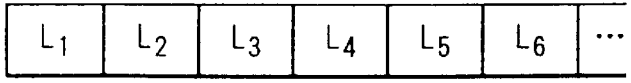
Figure 20F:
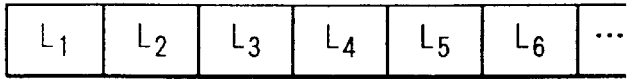
Figure 21A:
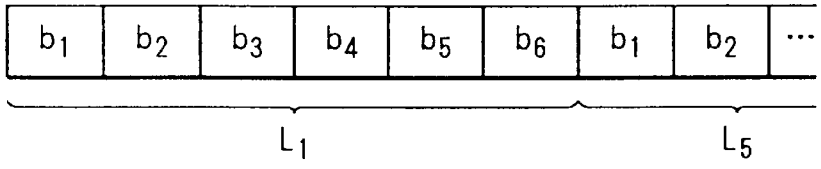
FIGS. 21(a)–21(d) illustrate image data after the conversion by the block-line parallel conversion unit.
Figure 21B:
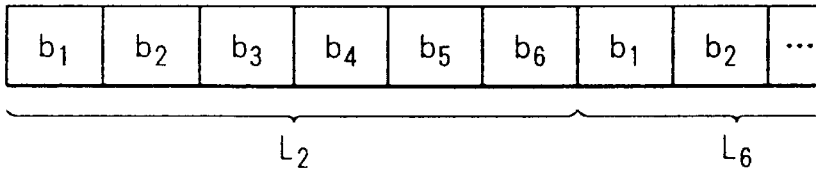
Figure 21C:
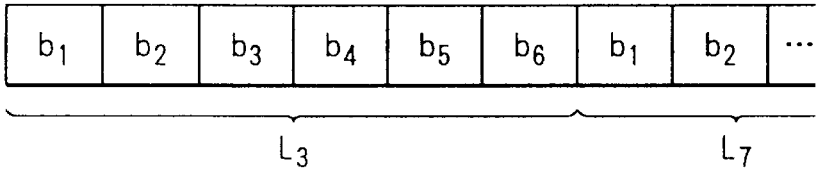
Figure 21D:
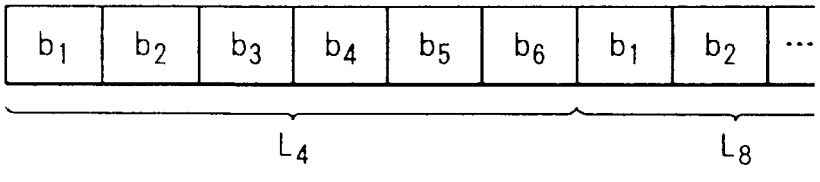

FIG. 19 shows specific constitution of the halftone processing circuit board 238. In the halftone processing circuit board 238, a block-line parallel conversion unit 451 receives the outputs 448 of the digital filter circuit board 237 (see FIG. 18). A reduction/enlargement unit 452, a density adjustment unit 454 for receiving image data 453 from the editing circuit board 241 (see FIG. 3), a halftone processing unit 455 and a four-value data conversion unit 456 are provided in this order downstream of the block-line parallel conversion unit 451. A diagnosis memory 458 is connected to the four-value data conversion unit 456, and stores output data 457 thereof. A control unit 461 controls the above respective units 451, 452, 454–456 and 458. A clock generation unit 462 supplies a clock signal to those units. The control unit 461 is connected to the VME bus 245. The control unit 461 receives the control signal 446 and 464 from the digital filter circuit board 237 and the editing circuit board 241, respectively, and forwards control signals 465 and 466 to the editing circuit board 241 and the data processing circuit board 251 (see FIG. 3), respectively.

In the digital copier of this embodiment, while the image reduction/enlargement in the sub-scanning direction is performed by changing the document feeding speed as in the case of analog copiers, the reduction/enlargement in the main scanning direction is performed by digital image processing. The digital image processing is very complex if it is performed in a parallel manner for the respective blocks. To solve this problem, the block-line parallel conversion unit 451 of the halftone processing circuit board 238 converts the image data sequences of the six (in total) respective blocks to image data sequences enabling line-by-line parallel processing.

FIGS. 20(*a*)–20(*f*) show a structure of the image data before the conversion by the block-line parallel conversion unit 451. As shown in these figures, before the conversion, each of the first to sixth blocks $b_1$–$b_6$ has an image data sequence arranged in the order of first line data $L_1$, second line data $L_2$, . . .

On the other hand, FIGS. 21(*a*)–21(*d*) show a structure of the image data after the conversion by the block-line parallel conversion unit 451. As shown in these figures, the above image data is converted to parallel image data sequences of four lines, that is, rearranged as follows. For example, as shown in FIG. 21(*a*), the data of the first to sixth blocks $b_1$–$b_6$ of the first line $L_1$ are sequentially arranged, and there follow the data of the fifth line $L_5$, ninth line $L_9$, and so forth. As shown in FIG. 21(*b*), the data of the second line $L_2$, sixth line $L_6$, tenth line $L_{10}$, and so forth are arranged in this order. The image data rearrangement is similarly performed for the remaining data as shown in FIGS. 21(*c*) and 21(*d*).

While the image data subjected to the conversion of the block-line parallel conversion unit 451 (see FIG. 19), the BKG flag and the sub-color flag are supplied to the reduction/enlargement unit 452, an area flag (area signal) 471 is sent to the editing circuit board 241 (see FIG. 3). Image data output from the reduction/enlargement unit 472 is also sent to the editing circuit board 241.

The remaining description of the halftone processing circuit board 238 will be made after the editing circuit board 241 is described below.

Editing Circuit Board

Figure 22:
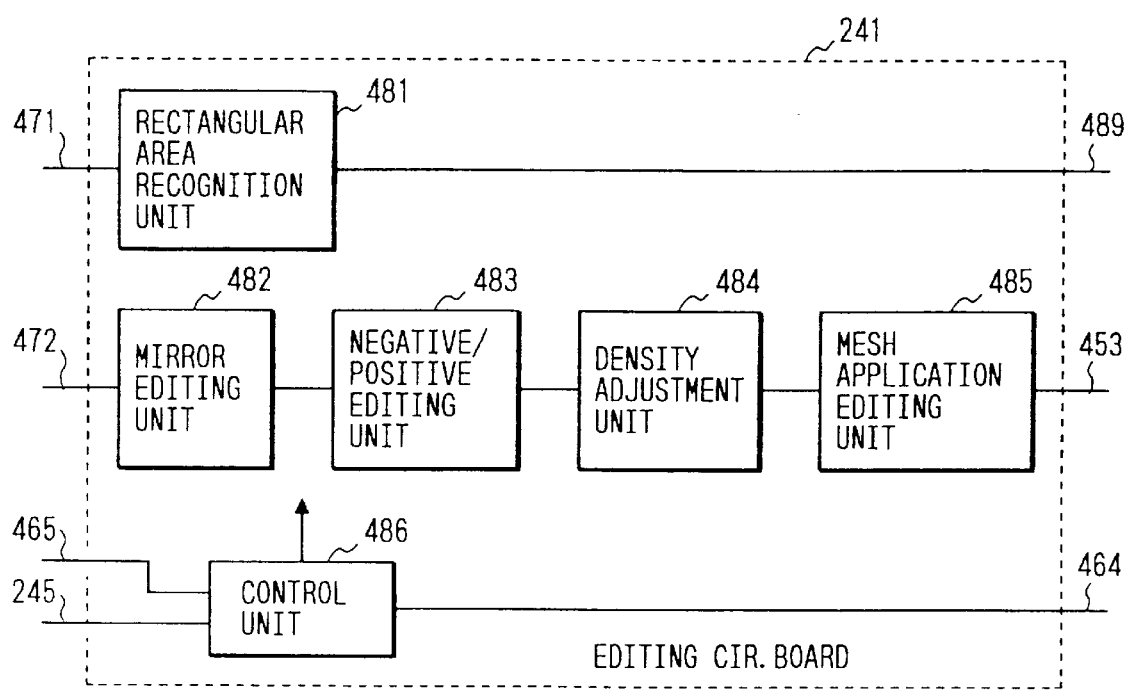
FIG. 22 is a block diagram showing specific constitution of an editing circuit board.

FIG. 22 shows specific constitution of the editing circuit board 241. The editing circuit board 241 has a rectangular area recognition unit 481 for receiving the area flag (area signal) 471 from the halftone processing circuit board 238 (see FIG. 19) and a mirror editing unit 482 for receiving the image data 472 from the halftone processing circuit board 238. A negative/positive editing unit 483, a density adjustment unit 484 and a mesh application editing unit 485 are provided in this order downstream of the mirror editing unit 482. A control unit 486 controls the above respective units 481–485. The mesh application editing unit 485 supplies image data 453 to the density adjustment unit 454 of FIG. 19. The control unit 486 is connected to the VME bus 245. The control unit receives the control signal 465 from the halftone processing circuit board 238, and sends the control signal 464 to the halftone processing circuit board 238.

The rectangular area recognition unit 481 supplies an area flag (area signal) to the reduction/enlargement unit 452 of FIG. 19. In connection with the area flag 489, a description is made below of an area designation method. The digital copier of this embodiment can designate an area by two methods.

Figure 23:
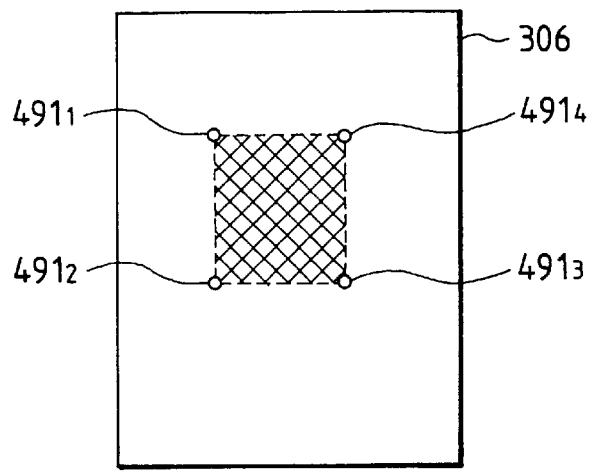
FIG. 23 illustrates designation of an area by enclosing it by a marker.

FIG. 23 illustrates the first area designation method in which an area is designated by enclosing it by a marker. When a rectangle is drawn on the document 306 with a marker pen, four corner points 491$_1$–491$_4$ are detected, based on which the rectangle is recognized. For example, various editing operations are performed on the area inside the rectangle.

Figure 24:
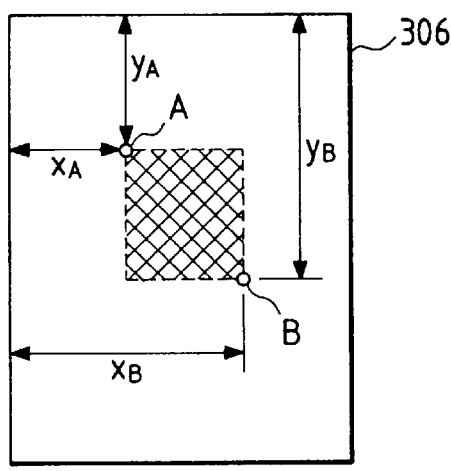
FIG. 24 illustrates input of an area by use of coordinates.

FIG. 24 illustrates the second area designation method in which an area is input in the form of coordinates. According to this method, distances $X_A$ and $X_B$ of points A and B on the document 306 as measured from the document left end and distances $Y_A$ and $Y_B$ of those points as measured from the document top end are input through the control panel 254 (see FIG. 3). Based on these coordinates, a rectangular area having the above two points as diagonal points is recognized. Various editing operations are performed on the recognized rectangular area.

The rectangular area recognition unit 481 recognizes a rectangular area and generates area flags (area signal) for respective pixels within the rectangular area. The area flags (area signal) 489 sequentially processed by the rectangular area recognition unit 481 are sent to the reduction/enlargement unit 452 of the halftone processing circuit board 238 (see FIG. 19). In the reduction/enlargement processing unit 452, the area flag 489, together with the BKG flag, sub-color flag and density data, are subjected to the reduction/enlargement operation. The image data 472 as subjected to the reduction/enlargement operation is sequentially sent to the mirror editing unit 482 of the editing circuit board 241 (see FIG. 22), which perform editing operations on the image data 472 on a realtime basis.

Figure 25:
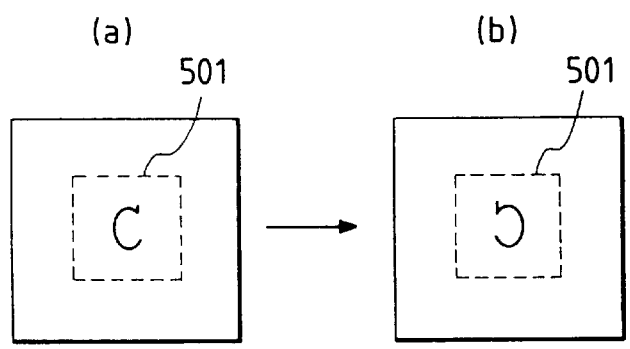
FIGS. 25(a) and 25(b) illustrate image processing in a mirror editing unit.

FIG. 25 illustrates an example of image processing performed in the mirror editing unit 482. The mirror editing unit 482 performs a mirror editing operation on a rectangular area 501 shown in part (a) of FIG. 25 (or on the entire image area) to produce a mirror image shown in part (b) of FIG. 25.

The negative/positive editing unit 483 of FIG. 22 next to the mirror editing unit 482 produces a negative/positive (i.e., white/black) inverted image. The density adjustment unit 484 next to the negative/positive editing unit 483 corresponds to a copy density adjustment function on the control panel 254 (see FIG. 3), and can select among several density conversion curves for each of the two output colors. The mesh application editing unit 485 performs mesh application in accordance with a mesh pattern selected through the control panel 254. The mesh application editing unit 485 also performs image deletion within an area (masking) and image deletion outside an area (trimming). Needless to say, the negative/positive editing and the mesh application editing can be effected for either an area enclosed by a marker or the entire image. The image data 453 subjected to the above successive operations is sent to the halftone processing circuit board 238 shown in FIG. 19.

Returning to the description of the halftone processing circuit board 238 of FIG. 19, the image data 453 as output from the editing circuit board 241 is input to the density adjustment unit 454. The density adjustment unit 454 has functions equivalent to the density adjustment unit 484 of the editing circuit board 241 (see FIG. 22). The editing circuit board 241 is an optional circuit board. If it is not included in the copier, the density adjustment is performed by the density adjustment unit 454 of the halftone processing circuit board 238. On the other hand, if it is included in the copier, the density adjustment unit 454 performs no actual operation. That is, if the editing circuit board 241 is included in the digital copier of this embodiment, it is possible to select the density of an mesh application pattern through the control panel 254 by use of the editing circuit board 241. To avoid having the density thus selected be varied by the copy density adjustment through the control panel 254, the copier is so constructed that the density adjustment is performed before the mesh application editing operation. Therefore, where the editing circuit board 241 is included, the density adjustment is performed by the density adjustment unit 484 of the editing circuit board 241.

In the halftone processing unit 455 shown in FIG. 19, multivalue image data is converted to four-value data according to the area gradation scheme. That is, the density of one pixel is converted to one of four gradation levels of white, first gray, second gray that is darker than the first gray, and black. The thus-processed data (four-value density data and sub-color flags) of a plurality of pixels are combined by the four-value data conversion unit 456 to become the output data 457, which is sequentially supplied to the data processing circuit board 251 that is located outside the image processor system rack 246 (see FIG. 3). For self-diagnosis, the diagnosis memory 458 stores the output data 457 of the four-value data conversion unit 456.

The data processing circuit board 251 of FIG. 3 forwards the image data sent from the halftone processing circuit board 238 to the page memory circuit board, where the image data is stored in a page memory. When the entire document 306 has been read in the above manner, the CPU 331 of the first CPU circuit board 244 (see FIG. 9) supplies information to the CPU of the second CPU circuit board 252 (see FIG. 3) via the control data line 257. In response, via the control data line 258, the CPU of the second CPU circuit board 252 sends to the control unit 266 of the printing section 221 (see FIG. 4) a sheet-feeding instruction and information indicating that the image data is stored in the image memory.

The control unit 266 of the printing section 221 (see FIG. 4) operates to feed a proper sheet, and to read the image data 255 from the page memory through the data processing circuit board 251 (see FIG. 3) at a predetermined timing by supplying the control signal 256 to the data processing circuit board 251. The image data 255 thus read is sent to the data separation unit 261 (see FIG. 4). The data separation unit 261 has a function of distributing the density data in accordance with the sub-color flag. For example, if the sub-color flag is "0," the density data is supplied to the first color image data memory 262 and white data is supplied to the second color image data 263. If the sub-color flag is "1," the density data is supplied to the second color image data memory 263 and white data is supplied to the first color image data memory 262. The printing section performs printing based on the xerography technologies, and includes two developers etc. for the first and second colors. Two color images formed on a photoreceptor (drum) are simultaneously transferred onto a sheet and fixed thereto. Two semiconductor lasers for exposure are also provided for the first and second colors, and drive-controlled by the first-color and second-color laser drive units 264 and 265, respectively in accordance with the image data.

Principle of Surface Color Removal

The total constitution of the digital copier of this embodiment has been described above. In the following, the surface color removal operation employed in this embodiment is outlined.

Figure 1:
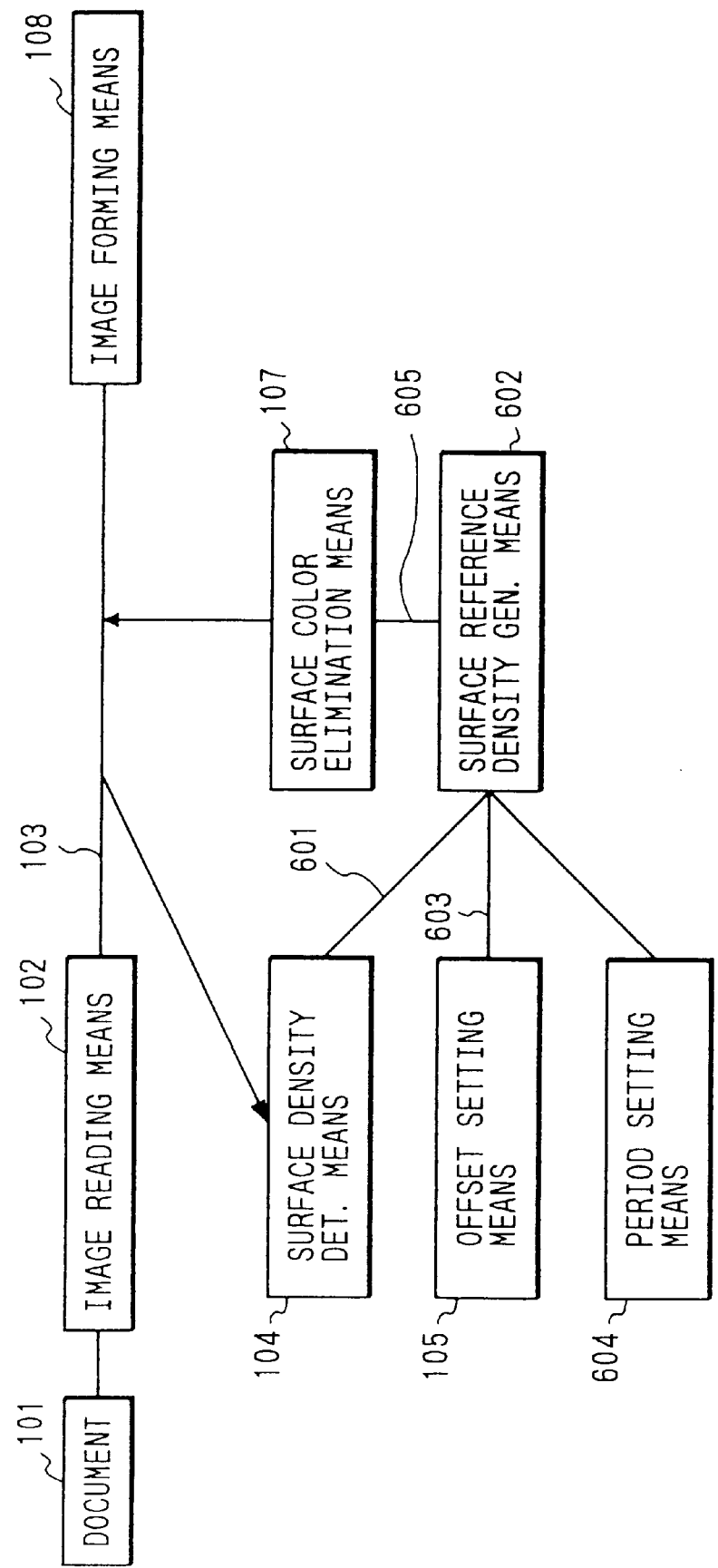
FIG. 1 is a block diagram showing conceptual constitution of a digital copier according to an embodiment of the present invention.
Figure 48:
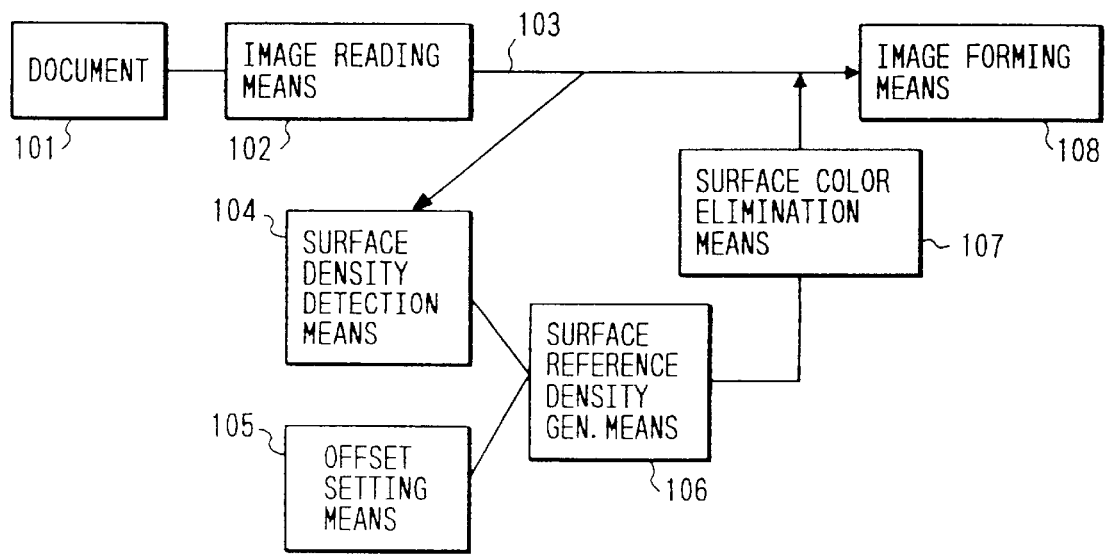
FIG. 48 is a block diagram showing conceptual constitution of a conventional image processing apparatus.

FIG. 1 shows the digital copier according to this embodiment, which is drawn by mainly extracting the portions relating to the surface color removal operation in such a manner as to show its principle. The parts in FIG. 1 that are the same as those in FIG. 48 are represented by the same reference numerals and descriptions therefor are omitted where appropriate. In the digital copier of this embodiment, density data 103 is supplied to a surface density detection means 104, which detects a surface density level 601 from the density data 103. An surface reference density generation means 602 adds to the surface density level 601 an offset 603 input from an offset setting means 105. A period setting means 604 switches, to a desired one, a period of sampling pixels for the surface density calculation of the surface reference density generation means 602.

A surface reference density 605 thus generated is input to a surface color elimination means 107, which eliminates a surface portion from the density data 103 supplied from the image reading means 102. That is, a portion of the image data 103 whose density is lower than or equal to the surface reference density 605 is corrected to a predetermined white density, and a portion whose density is higher than the surface reference density 605 is sent to an image forming means 108 without receiving any correction. Based on the image data 103, the image forming means 108 records an image of the document 101 onto a sheet (not shown).

The surface color removal operation may be performed by other types of constitution, which will be described later in the form of modifications. To aid in understanding of the invention, brief descriptions are made below of the principles of several types of modifications.

Figure 26:
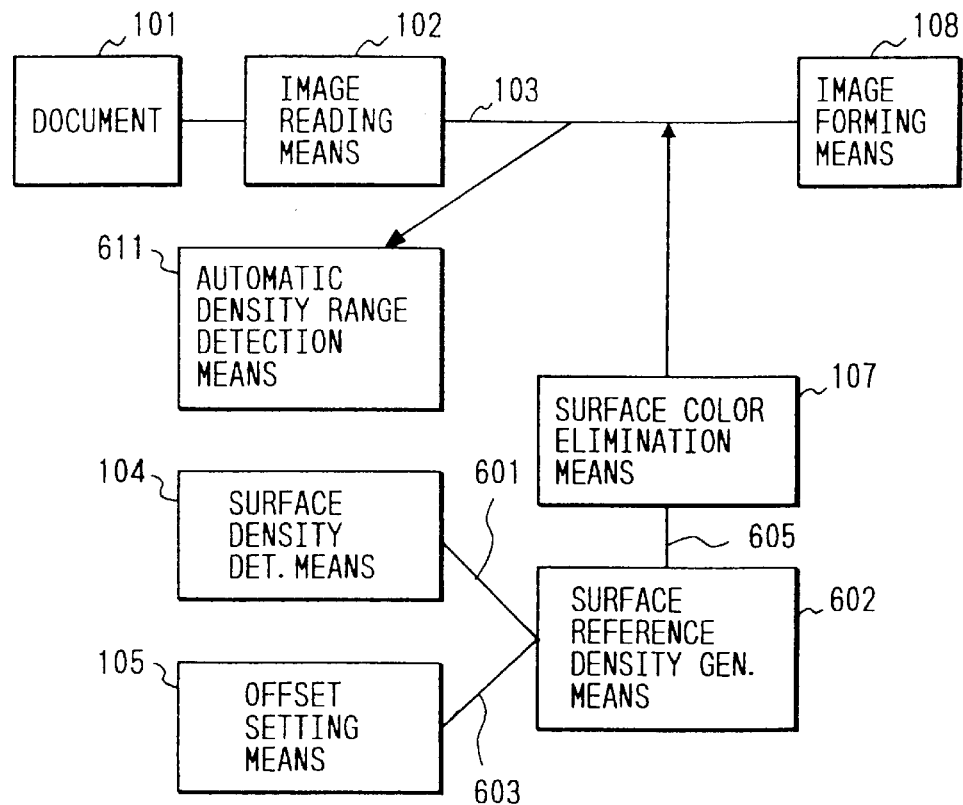
FIG. 26 is a block diagram showing a digital copier according to a first modification of the invention.

FIG. 26 shows a first modification of the invention. This digital copier has an automatic density range detection means 611 to enable automatic detection of a density range in accordance with the state of a document 101. Only the information of the density data 103 whose density is within the detected density range is input to the surface density detection means 104. The surface reference density generation means 602 adds to a resulting surface density level 601 the offset 603 input from the offset setting means 105, to generate the surface reference density 605. The other operations are the same as in the copier of FIG. 1.

Figure 27:
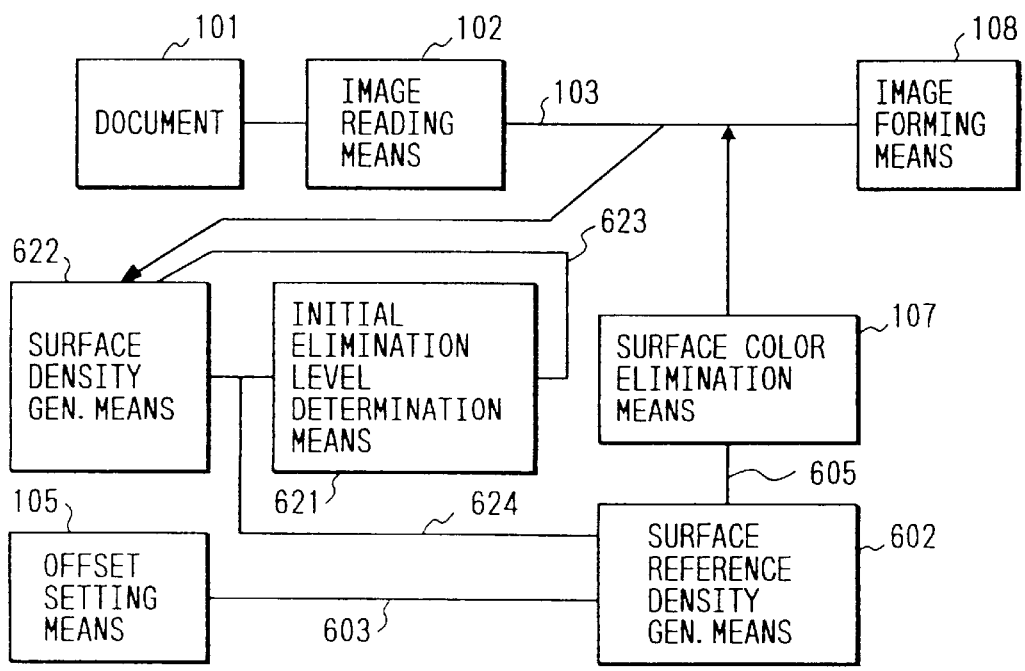
FIG. 27 is a block diagram showing a digital copier according to a second modification of the invention.

FIG. 27 shows a second modification of the invention. This digital copier has an initial elimination level determination means 621. A surface density detection means 622 supplies a surface density level 624 to the surface reference density generation means 602 using an initial elimination level 623 output from the initial elimination level determination means 621 until first determining the surface density level based on the density data 103. The surface reference density 605 is generated by adding to the surface density level 624 the offset 603 input from the offset setting means 105. The other operations are the same as in the copier of FIG. 1. It is noted that also in the digital copier of the embodiment the surface reference density 605 is generated by using the initial elimination level determination means 621 until the surface density level is determined only based on the density data 103 at the beginning portion of each line.

Figure 28:
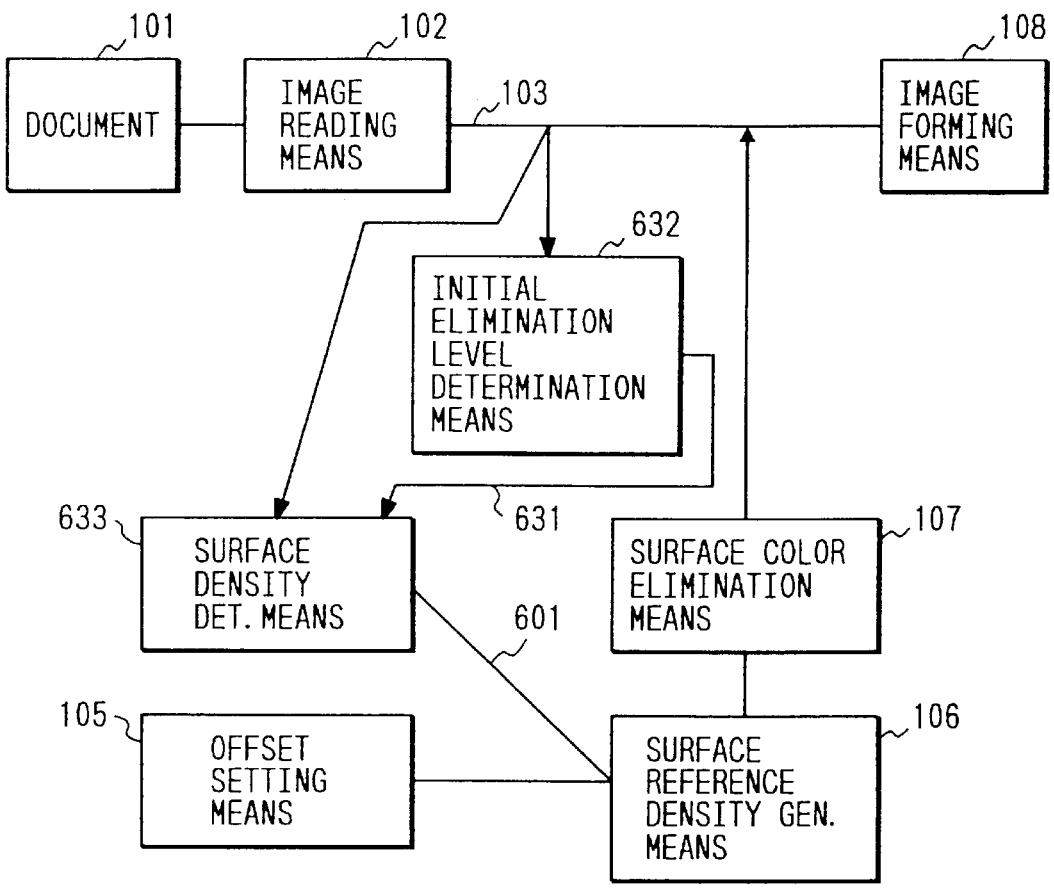
FIG. 28 is a block diagram showing a digital copier according to a third modification of the invention.

FIG. 28 shows a third modification of the invention. This digital copier has an initial elimination level determination means 632 which determines an initial elimination level 631 in accordance with the density data 103 receiving from the image reading means 102. Receiving the initial elimination level 631 and the density data 103, a surface density detection means 633 produces the surface density level 601 and supplies it to the surface reference density generation means 106. The other operations are the same as in the copier of FIG. 1. That is, this digital copier is different from the copier of FIG. 27 in that the initial elimination level 631 varies with the image density at the beginning portion of each line (the initial elimination level 623 is fixed).

Constitution of Surface Color Removal Portion of the Embodiment

Figure 29:
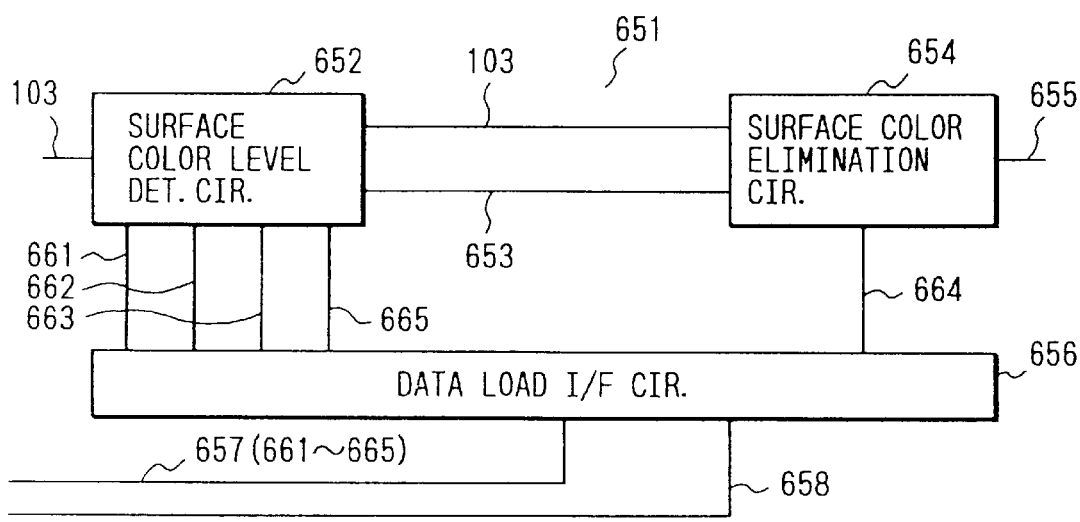
FIG. 29 is a block diagram showing a circuit configuration of a surface color removal portion of the digital copier.

FIG. 29 shows a circuit configuration of the surface color removal portion of the digital copier according to this embodiment. A surface color removal portion 651 has a surface color level detection circuit 652 which receives the density data 103. Receiving the density data 103 and a detected surface color level 653 from the surface color level detection circuit 651, a surface color elimination circuit 654 performs a correction in which the density data corresponding to a surface color is fixed to a level of a white image. The surface color elimination circuit 654 supplies corrected density data 655 to next circuits to effect image recording.

The surface color removal portion 651 also has a data load interface circuit 656, which loads load data 657 sent from the CPU 331 of the first CPU circuit board 244 (see FIG. 9). The timing of the loading is controlled by latch signals 658. The load data 657 consists of five kinds of data: absolute white level data 661, absolute black level data 662, initial elimination level data 663, offset level data 664 and period setting data 665.

Figure 30:
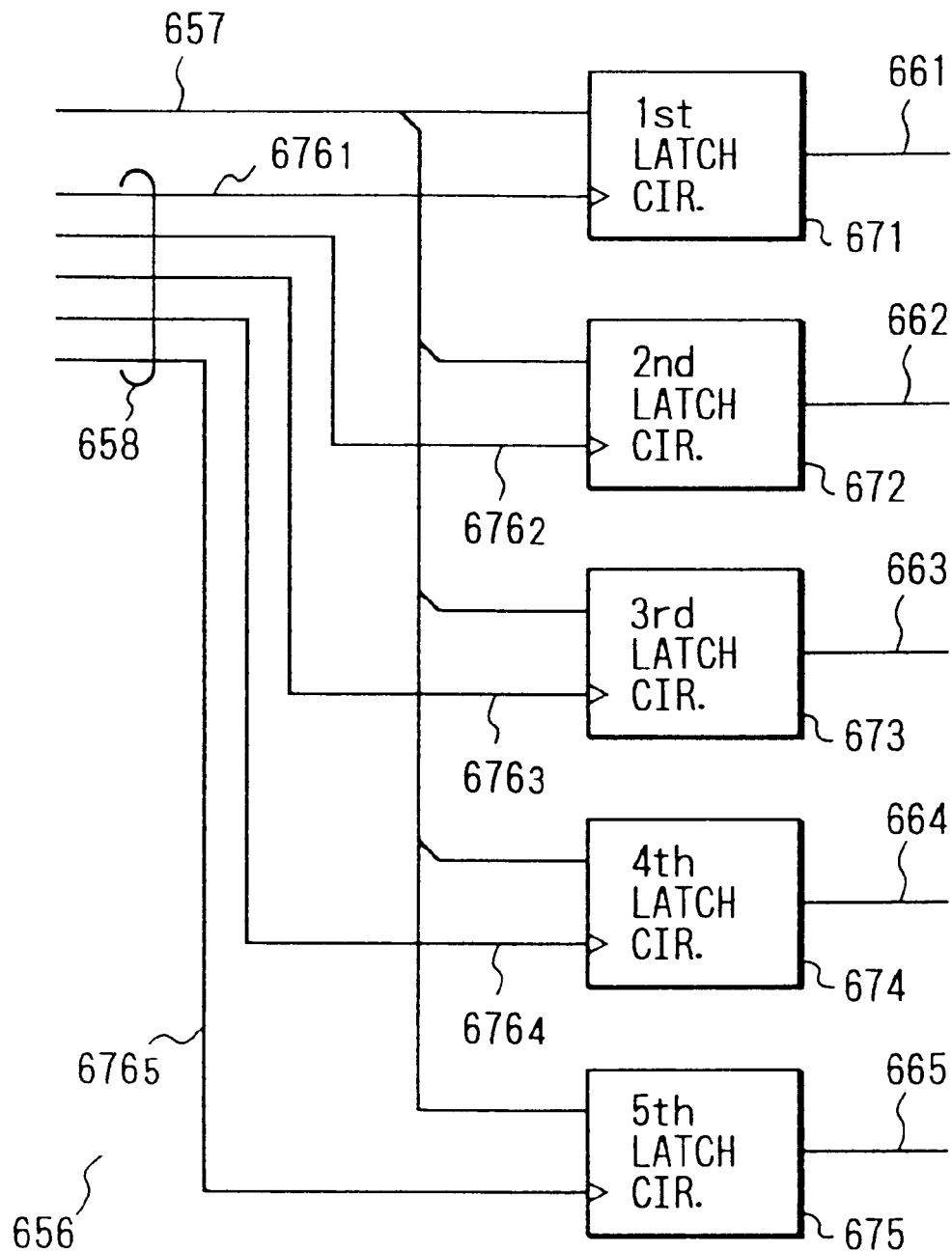
FIG. 30 is a block diagram showing a specific circuit configuration of a data load interface circuit.

FIG. 30 shows a specific configuration of the data load interface circuit 656. The data load interface circuit 656 has first to fifth latch circuits 671–675, to which the load data 657 is commonly supplied. The latch signals 658 are supplied to the first to fifth latch circuits 671–675 at different timings via individually provided latch lines $676_1$ to $671_5$. That is, the absolute white level data 661, absolute black level data 662, initial elimination level data 663, offset level data 664 and period setting data 665 are sequentially supplied as the load data 657 in a time-divisional manner, and the latch signals 658 are supplied to the first to fifth latch circuits 671–675 at different timings, so that the different kinds of data are latched in the latch circuits 671–675.

Figure 49:
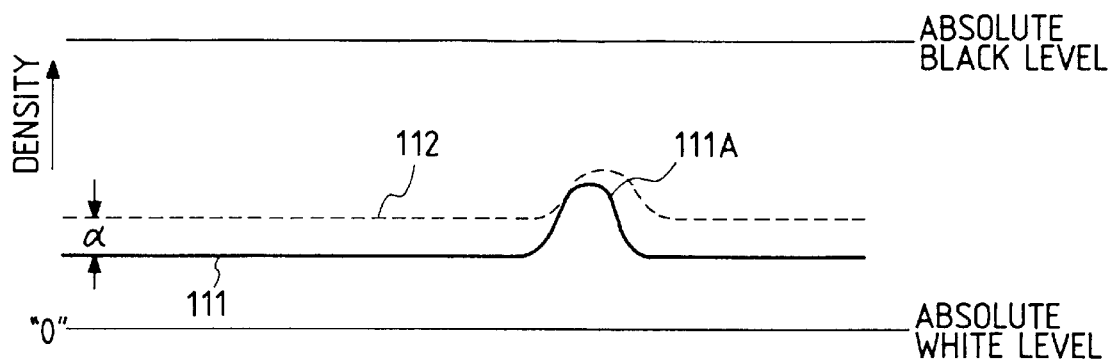
FIG. 49 is a graph showing a relationship between certain density data and a surface reference density variation of high response speed.
Figure 50:
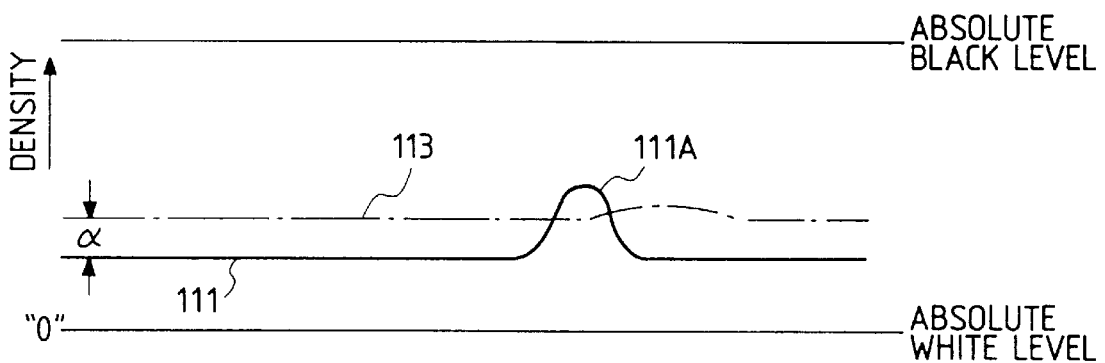
FIG. 50 is a graph showing a relationship between certain density data and a surface reference density variation of low response speed.

The absolute white level data 661 and the absolute black level data 662 represent the absolute white level and the absolute black level, respectively, which have already been described above in connection with FIG. 49. The initial elimination level data 663 represents the initial elimination level, which is a surface color level that is set until the surface color level starts to be determined based on the density data 103.

Figure 31:
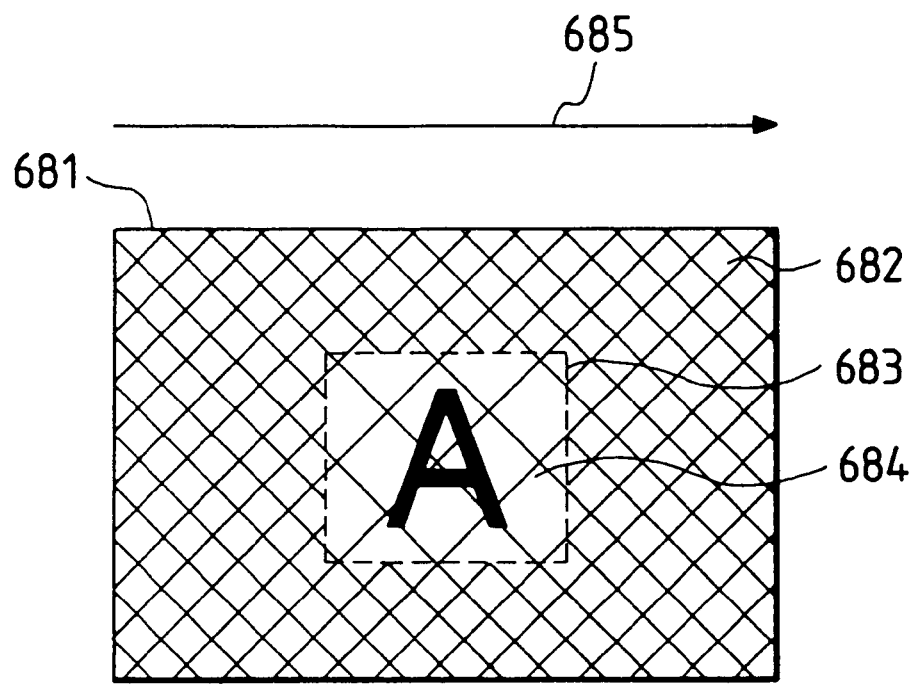
FIG. 31 illustrates an original image and a recording image when the absolute white level is not considered.
Figure 31:
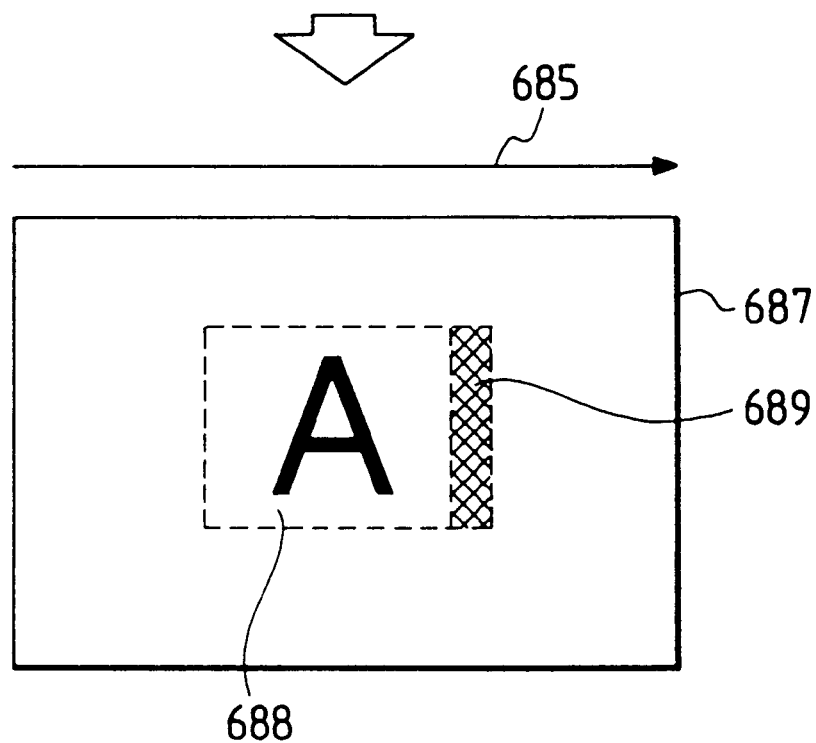

FIG. 31 illustrates the necessity of the absolute white level. In FIG. 31, it is assumed that a surface (i.e., background) 682 of a document 681 has a relatively high density. Another document 683 bearing a black character "A" is stuck to the document 681 at its central portion. A surface 684 of the document 683 has a density lower than the surface 682. The image processing is performed after the document 681 is read in the main scanning direction on a line-by-line basis.

If the absolute white level were not set, a shadow 689 would appear in a recorded image 687, more specifically, in an area starting from the end of a portion 688 corresponding to the document 683 and having a certain width. This is considered to be a result of actualization as an image of the surface 682 in the above area, and is explained below step by step. First, until the portion of the surface 684 starts to be scanned in the processing of the document 681, the density of the surface 682 is lower than the surface reference density and, therefore, it is replaced by the white level. While the portion of the surface 684 is scanned, it is also replaced by the white level without causing any problem because its density is lower than the density of the preceding portion. However, the surface reference density is now lowered due to the averaging in the above operation. Therefore, when the portion of the surface 682 is scanned immediately after the portion of the surface 684, the density level of the surface 682 is higher than the surface reference density, to cause the shadow 689.

To solve this problem, in this embodiment the absolute white level is specified, i.e., set at a level approximately equal to the density of the surface 682. Since a portion having a density lower than the absolute white level is forcibly replaced by the white level, the portion in which the shadow 689 would otherwise occur is also forcibly replaced by the white level. Therefore, no shadow occurs at a portion where the surface density changes as in FIG. 31.

Returning to the description of the data latched in the data load interface circuit 656, only the offset level data 664 representing the offset is input to the surface color elimination circuit 654. In this embodiment, to perform fine adjustment of the detected surface density, the detection surface color level is obtained by averaging the portion of the density data 103 whose density is within the predetermined range. If this detection surface color level itself were used as the surface reference density, a portion of surface might be erroneously recognized as an image portion in a document having a large surface density variation. The offset is provided to obtain the surface reference density by correcting the detection surface color level to a value conforming to the actual state of a document. In this embodiment, in the case where 256 gradation levels from "0" (white) to "255" (black) are provided, the offset is set at about "30" (decimal system) to accommodate documents having a surface density variation.

The period setting data 665 serves in setting the period of sampling the pixels for the averaging operation within the preset density range. In this embodiment, by changing the sampling period, a surface portion of a document having a large variation can be properly followed and recognized. The surface color level detection circuit 652 performs the surface color removal operation using the five kinds of data 661–665 described above.

Constitution of Surface Color Level Detection Circuit

Figure 32:
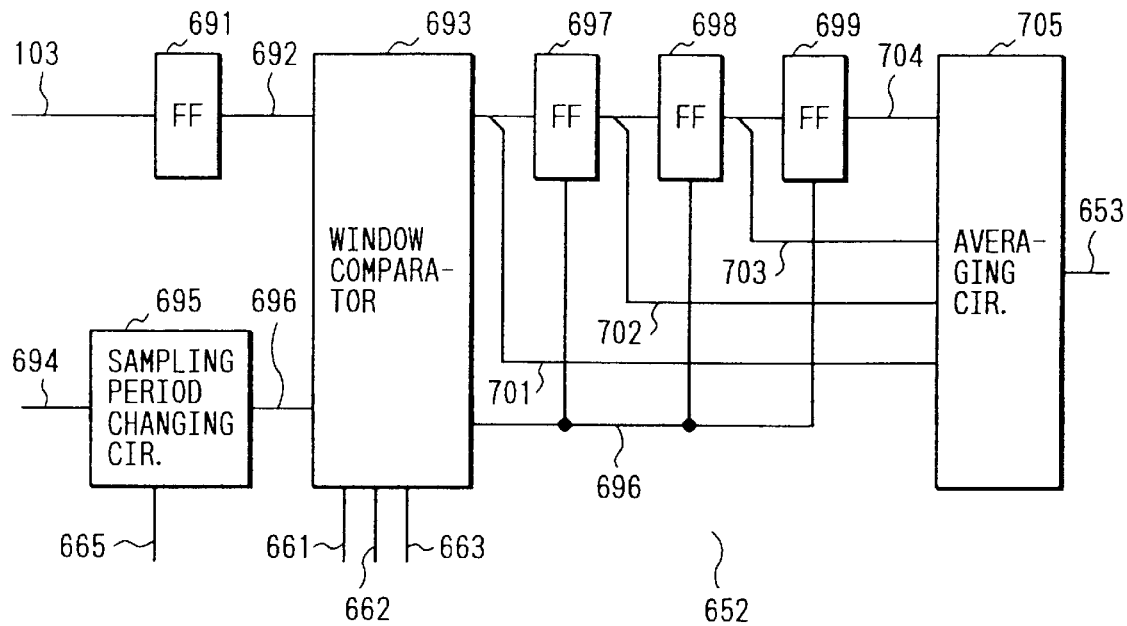
FIG. 32 is a block diagram showing specific constitution of a surface color level detection circuit of the embodiment shown in FIG. 29.

FIG. 32 shows a specific circuit configuration of the surface color level detection circuit 652 of FIG. 29. The surface color level detection circuit 652 has a first flip-flop circuit (FF) 691 for latching the density data 103 and a window comparator 693 for receiving latched density data 692. The window comparator 693 also receives a sample clock signal 696 from a sampling period changing circuit 695 which receives a video clock signal 694. The window comparator 693 further receives the absolute white level data 661, absolute black level data 662 and initial elimination level data 663 from the data load interface circuit 656 (see FIG. 29).

The sampling period changing circuit 695 outputs the sample clock signal 696 used for sampling, at a period specified by the period setting data 665, pixels from a sequence of pixels whose densities have been judged to be within the predetermined range by the window comparator 693. For example, where the period setting data 665 specifies sampling of the density data at a rate of one for four pixels, the sample clock signal 696 is generated at a period enabling sampling of the density data (pixels whose densities are within the predetermined range) at a rate of one for four pixels.

The window comparator 693 includes a comparison gate circuit. Determining whether the density data 692 of each input pixel is located within the density range defined by the absolute black level and the absolute white level, the window comparator 693 samples the density data 692 of the respective pixels determined to have densities within the above range.

Second to fourth, series-connected flip-flop circuits 697–699 are provided on the output side of the window comparator 693. The sample clock signal 696 is supplied, as a clock signal, to the flip-flop circuits 697–699. Density data 701–704 of four pixels, which have been temporally shifted by four clocks in total by the second to fourth flip-flop circuits 697–699, are simultaneously input to the averaging circuit 705. The averaging circuit 705 takes an average of the simultaneously input density data 701–704 of four pixels. This averaging operation is performed such that the density data of four pixels are added together and then the resulting sum value is shifted rightward by two bits. The average of the density data 701–704 is sent, as a detection surface color level 653, to the following circuits.

The initial elimination level data 663 is also input to the window comparator 693, and is forwarded to the following circuits as the detection surface color level 653 until the average of the density data 701–704 is obtained in the above manner.

After the average of the density data 701–704 of a certain scanning line starts to be output from the window comparator 693, the average is output as the detection surface color level 653 every time the density data 701–704 of four pixels are added together. In this manner, the point of processing moves forward in the scanning direction on that scanning line.

Figure 33:
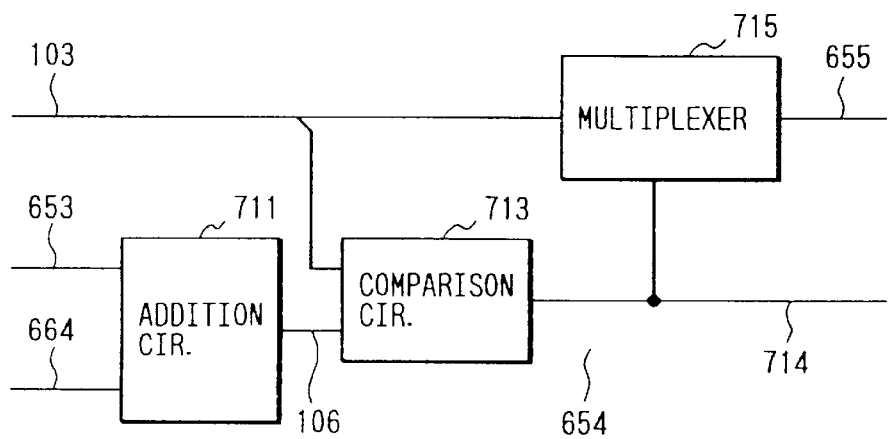
FIG. 33 is a block diagram showing specific constitution of a surface color elimination circuit.

FIG. 33 shows a specific circuit configuration of the surface color elimination circuit 654. The surface color elimination circuit 654 has an addition circuit 711 which adds together the received detection surface color level 653 and offset level data 664. With the addition of the offset, the detection surface color level 653 sequentially output from the averaging circuit 705 (see FIG. 32) is converted to a final surface color elimination level (i.e., surface reference density 106). The surface reference density 106 is compared with the density data 103. While the comparison result is output as a surface color flag 714 when the density data 103 is smaller than the surface reference density 106, it serves as a control input to a multiplexer 715.

The density data 103 is supplied to the multiplexer 715. The multiplexer 715 outputs the density data 103 itself as corrected density data 655 when the surface color flag 714 is not established. When the surface color flag 714 is established, the multiplexer 715 corrects the density data 103 to the white density "0" and outputs it as the density data 655.

The above operation is repeated on a line-by-line basis. At the beginning portion of each line, the operation is performed with the use of the initial elimination level 663.

Example of image processing

Figure 34:
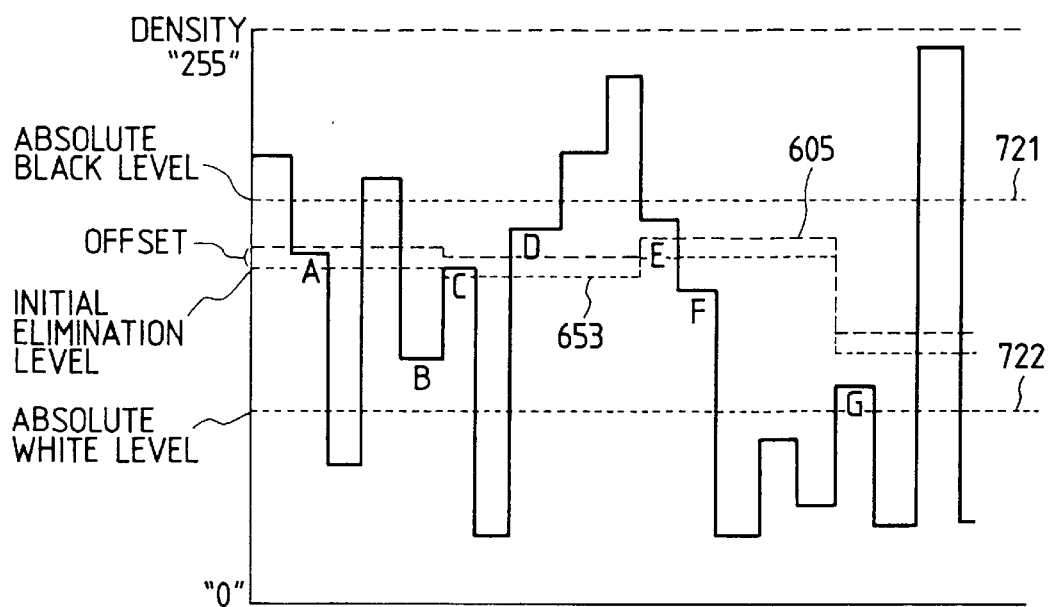
FIG. 34 is a graph showing an example of density data.

FIG. 34 shows an example of the density data. The ordinate represents the density level having 256 gradation levels from "0" to "255." Dotted lines 721 and 722 represent the absolute black level and the absolute white level, respectively, and the density data belonging to the range between these two levels are subjected to the operations relating to the surface color. Another dotted line represents the detection surface color level 653. The initial value of the detection surface color level 653 coincides with the initial elimination level. The sum (i.e., surface reference density 605 represented by a dashed line) of the detection surface color level 653 and the offset is the reference level used for determining whether the density data represents a surface portion or image portion.

A description is made of a case where the density data of pixels belonging to the predetermined density range are sampled at a rate of one for two pixels. In the case of FIG. 34, there are five pixels A, B, C, D, E, F and G having a density between the absolute black level 721 and the absolute white level 722. If the sampling is performed at a rate of one for two pixels starting from the pixel A, the density data of the pixels A, C, E and G are actually sampled and subjected to the averaging operation.

Figure 35:
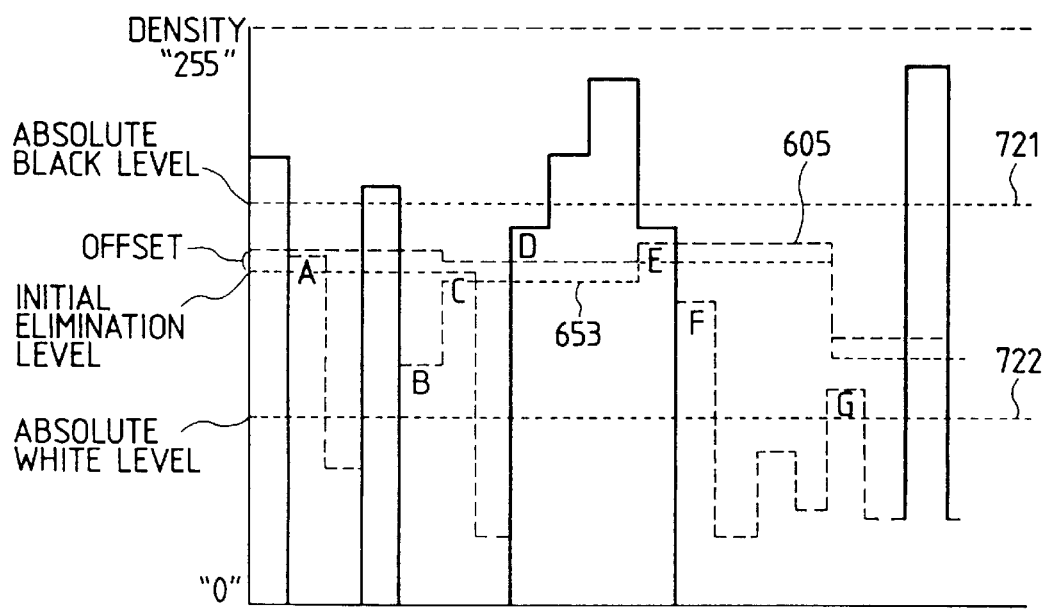
FIG. 35 is a graph showing density data output from the surface color elimination circuit after processing the density data of FIG. 34.

FIG. 35 shows an output of the surface color elimination circuit 654 corresponding to the example of FIG. 34. The surface color elimination circuit 654 outputs, as the density data 655, the density data itself when it is larger than the absolute black level 721, and fixes it to the white density "0" when it is smaller than the absolute white level 722. The density data of the pixels A, B, C, F and G whose densities are lower than the surface reference density 605 obtained by the averaging etc. are also fixed to the white density "0." In this manner, a surface portion on a document is removed.

At the stage when the pixel A of FIGS. 34 and 35 (head pixel of a scanning line) is processed, there have not been prepared four pixels necessary for the average operation. In this case, the detection surface color level 653 is calculated by setting three pixel data having the initial elimination level (detection surface color level 653 at the initial stage) of three pixels. The detection surface color level $d_A$ is calculated by equation (1):

$$d_A = \frac{(n_I + n_I + n_I + n_A)}{4} \tag{1}$$

where $n_I$ is the detection surface color level 653 at the initial stage and $n_A$ is the density of the pixel A.

By adding the offset $O_{FF}$ to the value obtained by equation (1), the surface reference density 605 is obtained, whose level $d_{TH}$ is expressed by equation (2):

$$d_{TH} = \frac{(n_I + n_I + n_I + n_A)}{4} + O_{FF} \tag{2}$$

In this example, since the level $d_{TH}$ of the surface reference density 605 thus set is higher than the density $n_A$ of the pixel A, the latter is corrected to the white density "0."

The densities of the pixels D and E, which are lower than the absolute black level 721 and higher than the level $d_{TH}$ of the surface reference density 605, are output as they are as the density data 655. The level $d_{TH}$ of the surface reference density 605 of the pixel E is expressed by equation (3):

$$d_{TH} = \frac{(n_I + n_A + n_C + n_E)}{4} + O_{FF} \quad (3)$$

where $n_C$ and $n_E$ are densities of the pixels C and E, respectively.

With respect to pixels after the pixel G, the surface reference density 605 is set without being influenced by the initial elimination level, and surface color removal operation is performed based on the surface reference density 605 thus set.

Figure 36:
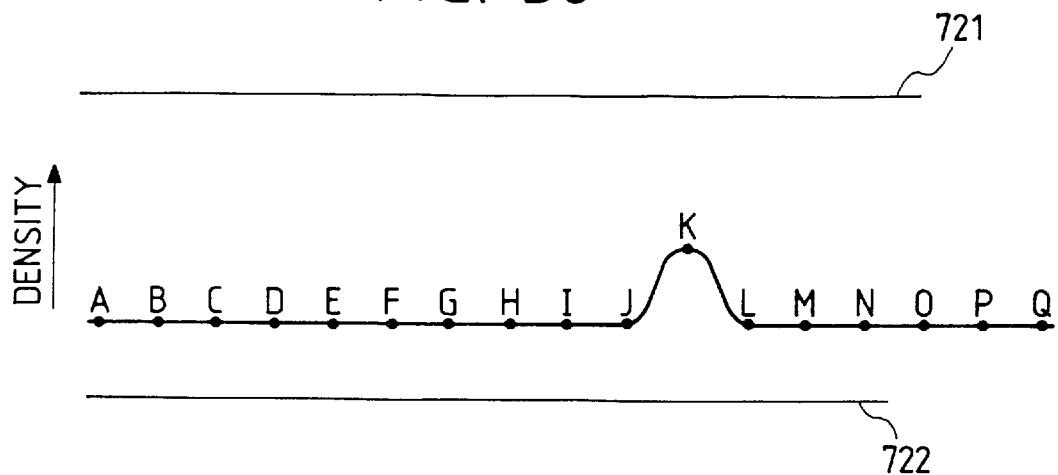
FIG. 36 is a graph showing, in an analog form, a density distribution of a document in which a low-contrast thin line is drawn as an image on a white sheet.

FIG. 36 shows an analog representation of a density profile of a low-contrast thin line (image) drawn on a white sheet. Characters A–Q represent respective pixels on a scanning line.

Figure 37:
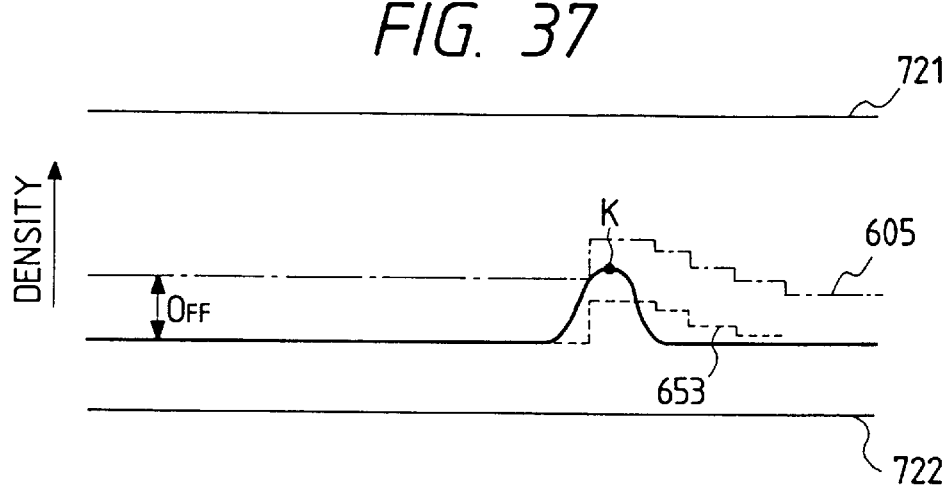
FIG. 37 is a graph showing a variation of surface reference densities when the document of FIG. 36 is sampled every pixel.

FIG. 37 shows a variation of the surface reference density 605 when the respective pixels on the above document are sampled. In this case, as shown in FIG. 37, the detection surface color level 653 follows the density of the pixel K belonging to the thin line. The surface reference density 605 at this position is the density level obtained by adding the offset $O_{FF}$ to the detection surface density. That is, at the position of the pixel K, the detection surface color level 653 is obtained as an average of the density data of the four pixels H, I, J and K. Since the surface reference density 605 obtained by adding the offset $O_{FF}$ to the detection surface color level 653 is higher than the density $n_K$, the data of the pixel K is eliminated being judged a surface portion.

Figure 38:
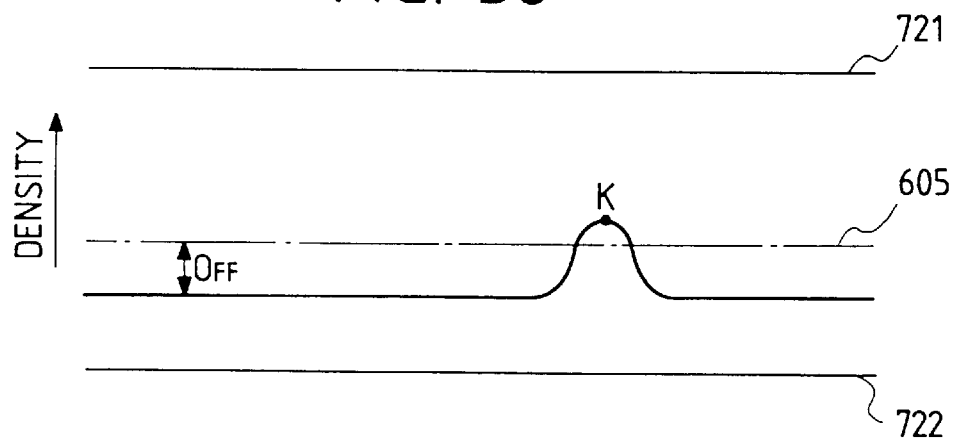
FIG. 38 is a graph showing a case when the document of FIG. 36 is sampled at a rate of one for 16 pixels.

FIG. 38 shows a case where the same image is sampled at a rate of one for 16 pixels. If the sampling period (interval between the pixels to be sampled) is set long in this manner, the pixel Q is sampled after the pixel A, for instance. Therefore, in most cases the density data of the pixel K on the thin line has no contribution to the setting of the detection surface color level 653 (the possibility of contribution: 1/16), and the density $n_K$ becomes higher than the surface reference density 605 obtained by adding the offset $O_{FF}$ to the detection surface color level 653. In this case, the thin line can be reproduced.

Figure 39:
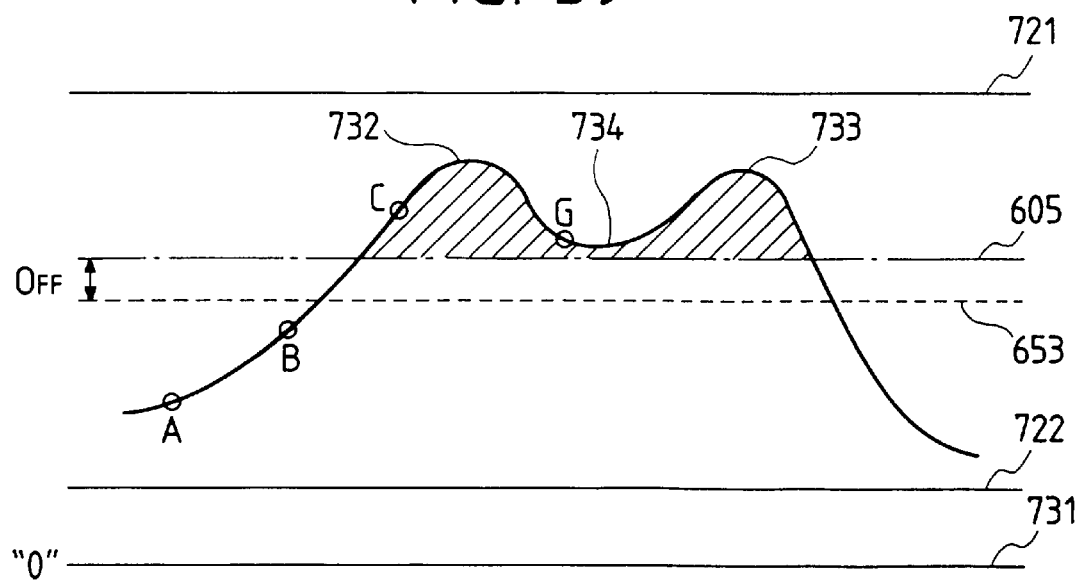
FIG. 39 is a graph showing "reclamation" occurring between two thin lines when a document is read.

FIG. 39 illustrates "reclamation" of a portion existing between two thin lines. In FIG. 39, white circles indicate positions of respective pixels which have been sampled at a rate of one for four pixels. The "0" level 731, absolute white level 722 and absolute black level 721 are represented by solid lines. The detection surface color level 653 is represented by a dashed line, and the surface reference density 605 as the finally determined surface color elimination level is represented by a chained line.

In general, it is known that the image reading by a reading device causes a reduction of the MTF (modulation transfer function) in a high-frequency range. This will raise the surface density at a portion interposed between two thin lines 732 and 733 shown on in FIG. 39. Although not shown any drawings, the similar problem occurs in the case of a space between adjacent thin lines constituting a character. In this specification, this phenomenon is called "reclamation" of an image portion. The existence of reclaimed portions much deteriorates the resolution and the sharpness of characters.

To avoid the occurrence of reclamations, it is necessary to sample, as frequently as possible, pixels whose densities are located between the absolute black level 721 and the absolute white level 722 to detect a reclaimed portion 734 as a surface portion. In the example of FIG. 39, the sampling is performed at a rate of one for four pixels. The level $d_{TH}$ of the surface reference density 605 at the position of a pixel G is given by equation (4), and is lower than a density $n_G$ of the pixel G:

$$d_{TH} = \frac{(n_A + n_B + n_C + n_G)}{4} + O_{FF} < n_G \quad (4)$$

That is, in this case the reclaimed portion 734 is output as it is, and hardly discriminated from the two thin lines 732 and 733.

Figure 40:
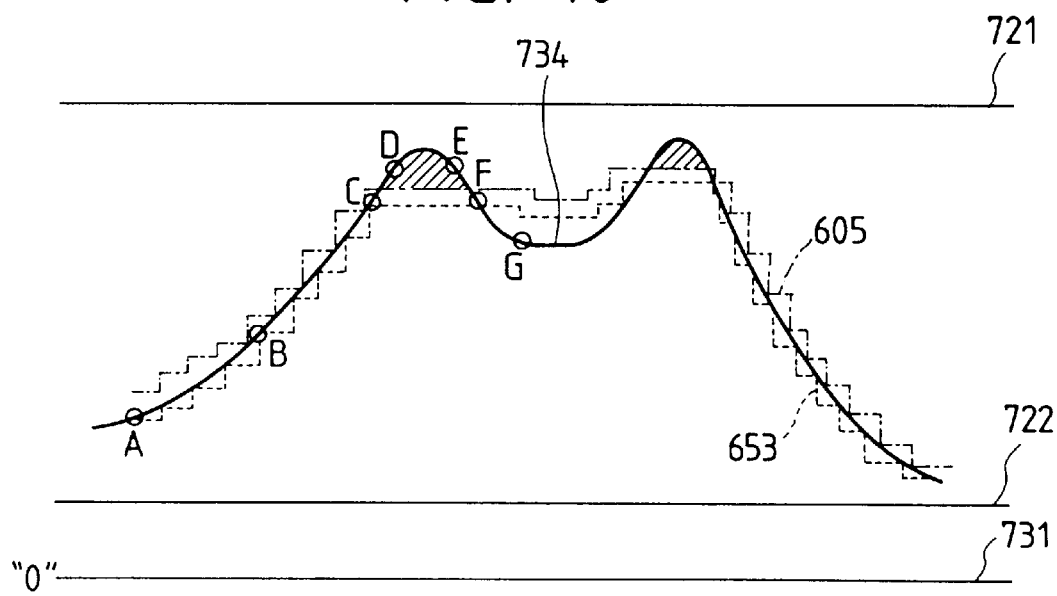
FIG. 40 is a graph showing how the reclamation is prevented when the same document as in FIG. 39 is sampled every pixel.

FIG. 40 shows a case where the same image as in FIG. 39 is sampled every pixel. In this case, three pixels D, E and F are additionally sampled between the two pixels C and G that are sampled in the case of FIG. 39. With the sampling operation of FIG. 40, the level $d_{TH}$ of the surface reference density 605 at the position of the pixel G is given by equation (5), and is higher than a density $n_G$ of the pixel G:

$$d_{TH} = \frac{(n_D + n_E + n_F + n_G)}{4} + O_{FF} > n - G \quad (5)$$

As a result, being judged a surface portion, the reclaimed portion 734 is corrected to the white density. It is understood that by changing the period of sampling the pixels in the above manner, the resolution and the sharpness of characters which have once deteriorated in the reading system can be recovered. With this advantage, the digital copier of this embodiment can provide a superior image quality to the conventional ones.

On the other hand, in conventional copiers not associated with digital processing (what is called analog copiers), in developing an electrostatic latent image formed on a photoreceptor it is possible to change an area of the electrostatic latent image developed with a toner by changing a bias potential of a developing device, to thereby adjusting an image transferred to a sheet. However, in those copiers, it is impossible to perform such bias adjustment while determining the state of an image. In conclusion, the digital copier of this embodiment can also provide a superior image to conventional analog copiers.

First Modification of the Invention

Figure 41:
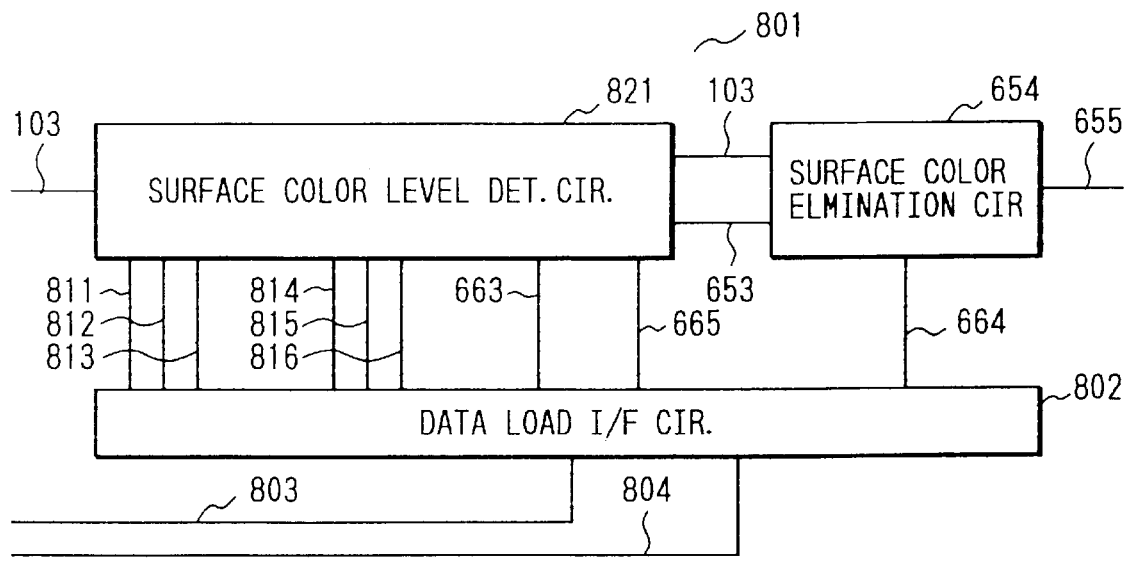
FIG. 41 is a block diagram showing specific constitution of a surface color removal portion of the digital copier of the first modification of the invention.

FIG. 41 shows a circuit configuration of a surface color removal portion 801 of a digital copier according to a first modification of the invention. The surface color removal portion 801 corresponds to the surface color removal portion 651 of the above embodiment shown in FIG. 29. Therefore, the same parts in FIG. 41 as in FIG. 29 are given the same reference numerals and descriptions therefor are omitted where appropriate.

As its principle has been described with reference to FIG. 26, the first modification is so constructed as to enable detection and setting of the proper density range. To this end, a data load interface circuit 802 loads load data 803 sent from the CPU 331 of the first CPU circuit board 244 (see FIG. 9). The load timing is controlled by latch signals 804. The load data 803 includes nine kinds of data: three kinds of absolute white level data 811–813, three kinds of absolute black level data 814–816, single initial elimination level data, single offset level data 664 and single period setting data 665.

The data load interface circuit 802 supplies a surface color level detection circuit 821 with the eight kinds of data 811–816, 663 and 665 other than the offset level data 664. Receiving the density data 103, the surface color level detection circuit 821 supplies the received density data 103 and a detection surface color level to a surface color elimination circuit 654. As in the case of the above embodiment, the surface color elimination circuit 654 outputs corrected density data 655.

Figure 42:
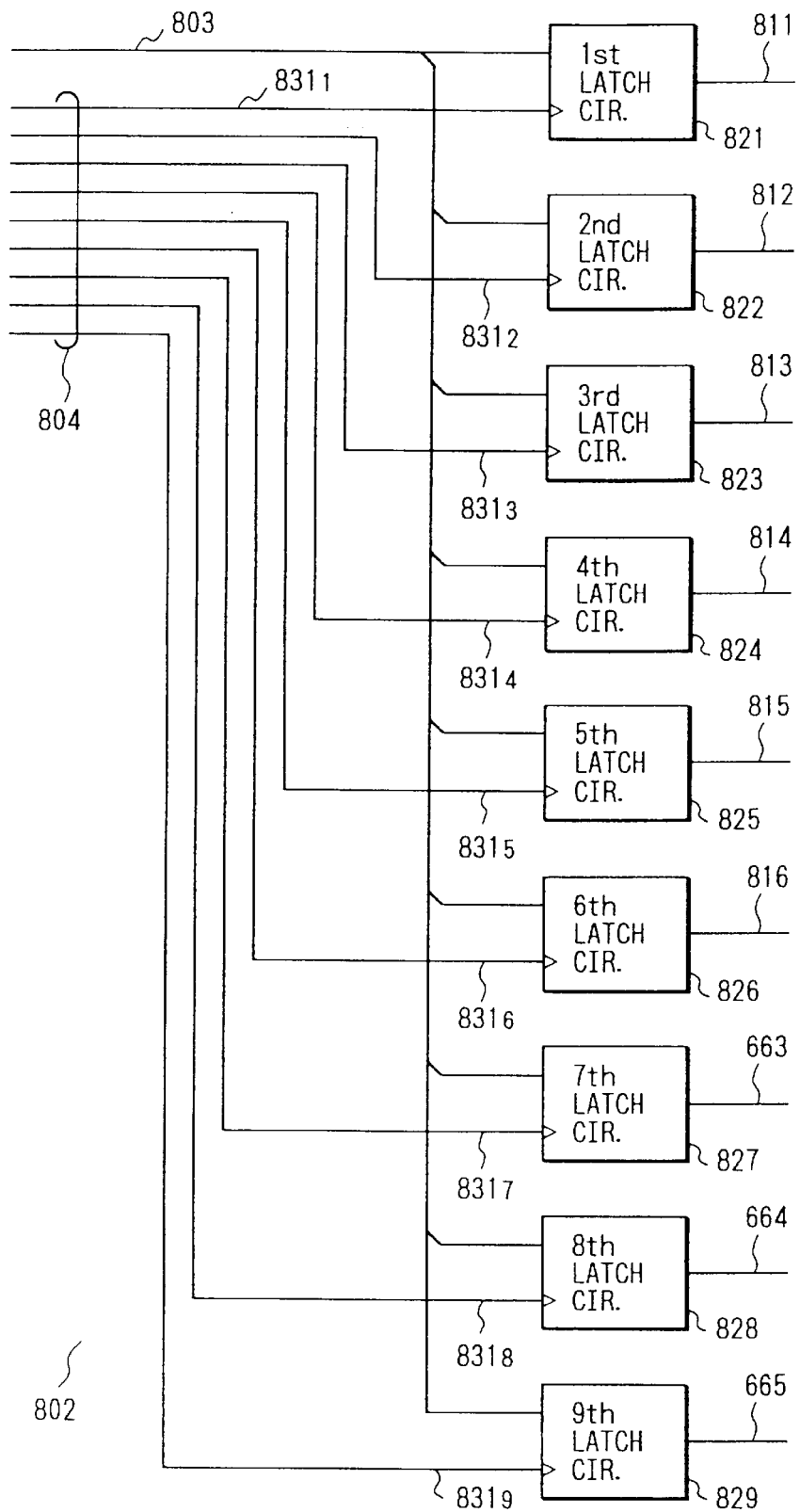
FIG. 42 is a block diagram showing a specific circuit configuration of a data load interface circuit of the first modification.

FIG. 42 shows a specific configuration of the data load interface circuit 802, which has first to ninth latch circuits 821–829. The load data 803 is commonly input to the first to ninth latch circuits 821–829. The latch signals 804 are supplied to the first to ninth latch circuits 821–829 at different timings via individually provided latch lines $831_1$–$831_9$. That is, the first to third absolute white level data 811–813, first to third absolute black level data 814–816, initial elimination level data 663, offset level data 664 and period setting data 665 are sequentially input as the load data 803 in a time-divisional manner, and the latch signals 804 are input to the first and ninth latch circuits 821–829 at different timings. As a result, the different kinds of data are latched in the latch circuits 821–829.

Figure 43:
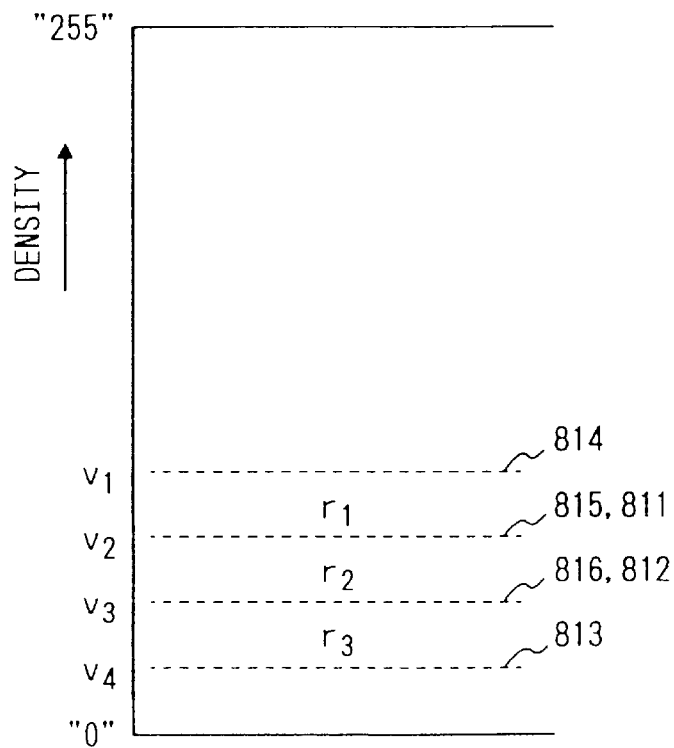
FIG. 43 illustrates a relationship among density levels of three absolute white level data and three absolute black level data used he first modification.

FIG. 43 shows a relationship among density levels of the three kinds of absolute white level data 811–813 and the three kinds of absolute black level data 814–816. Th ordinate represents the density in the form of a digital quantity of 256 gradation levels, where "0" means the highest degree of white and "255" means the highest degree of black. In this first modification, the range in which a surface color is expected to exist is divided into three sections of a first range $r_1$, a second range $r_2$ and a third range $r_3$. An upper limit $v_1$ of the first, highest-density (darkest) range $r_1$ is represented by the first absolute black level data 814. An upper limit $v_2$ of the second, intermediate density range $r_2$ is represented by the second absolute black level data 815. Similarly, an upper limit $V_3$ of the third range $r_3$ is represented by the third absolute black level data 816.

A lower limit $v_2$ (equal to the upper limit of the second range $r_2$) of the first range $r_1$ is represented by the first absolute white level data 811. A lower limit $v_3$ (equal to the upper limit of the third range $r_3$) of the second range $r_2$ is represented by the second absolute white level data 812. Similarly, a lower limit $V_4$ of the third range $r_3$ is represented by the third absolute white level data 813.

Figure 44:
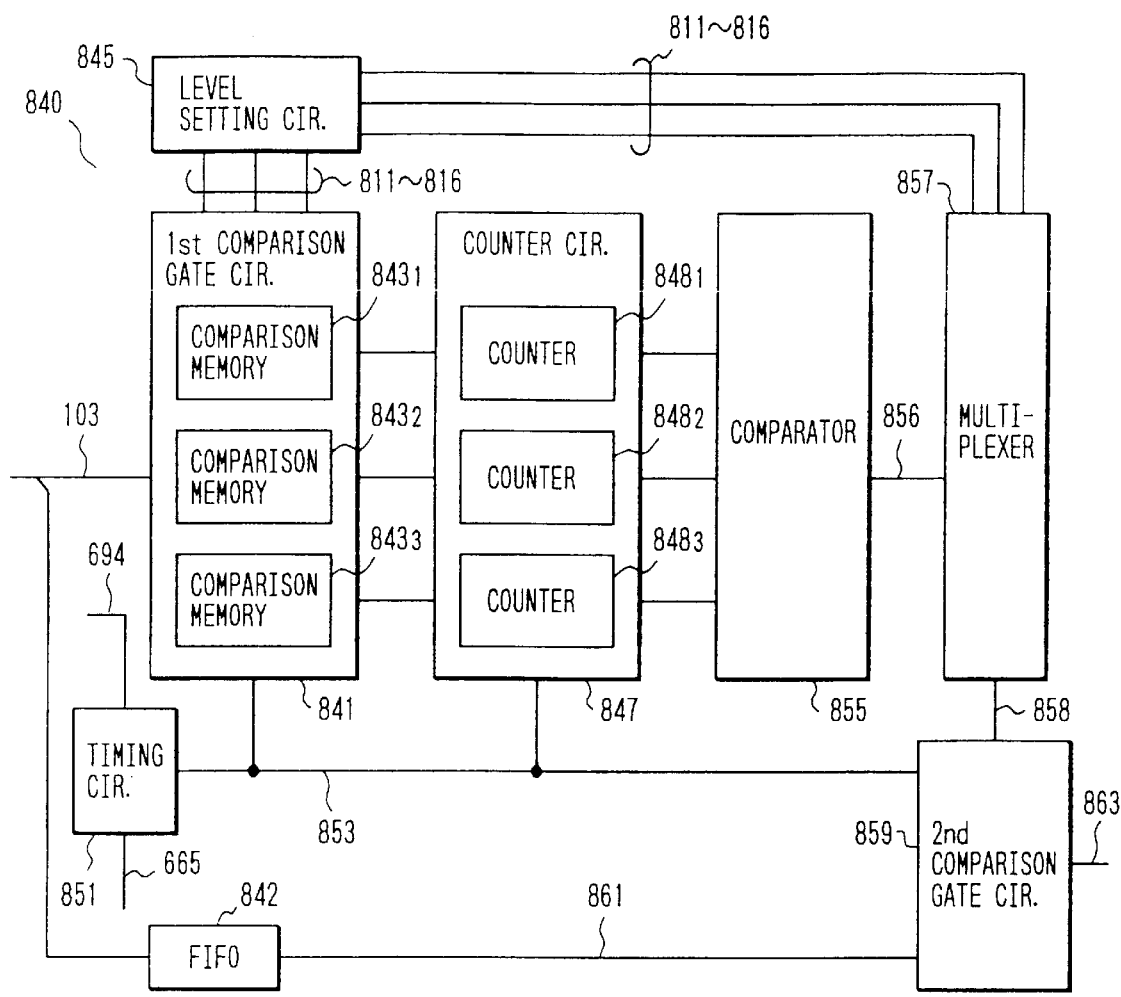
FIG. 44 is a block diagram showing constitution of a density detection portion of the first modification.

FIG. 44 shows constitution of a density detection unit 840 of the first modification. In the density detection unit 840, the density data 103 is input to both of a first comparison gate circuit 841 and a FIFO memory 842. The first comparison gate circuit 841 has three comparison memories $843_1$–$843_3$, and stores the first to third absolute white level data 811–813 and the first to third absolute black level data 814–816, which are set in a level setting circuit 845, in respective memory areas. More specifically, the first absolute white level data 811 and the first absolute black level data 814 are stored in the first comparison memory $843_1$, the second absolute white level data 812 and the second absolute black level data 815 are stored in the second comparison memory $843_2$, and the third absolute white level data 813 and the third absolute black level data 816 are stored in the third comparison memory $843_3$.

A counter circuit 847 is provided on the output side of the first comparison gate circuit 841. The counter circuit 847 has three counters $848_1$ to $848_3$ which correspond to the three comparison memories $843_1$–$843_3$, respectively. Each of the first to three counters $848_1$–$848_3$ counts pixels of the density data 103 having a density located between the absolute white level and the absolute black level that are stored in the corresponding one of the comparison memories $843_1$–$843_3$.

Receiving the video clock signal 694, a timing circuit 851 generates a timing clock 853 and supplies it to both of the first comparison gate circuit 841 and the counter circuit 847.

Data indicating the number of pixels of each density range counted by the counter circuit 847 is input to a comparator 855. The comparator 855 generates a selecting signal 856 indicating the density range associated with the maximum count among the three density range, and input it to a multiplexer 857. The multiplexer 857 is supplied with three pairs of the absolute white level data 811–813 and the absolute black level data 814–816. Based on the selection signal 856, the absolute white level data and absolute black level data 858 corresponding to the maximum count are output from the multiplexer 857, and input to a second comparison gate circuit 859.

The second comparison gate circuit 859 is supplied with density data 861 delayed by just one scanning line period by the FIFO memory 842. That is, the FIFO memory 842 may be replaced by any other memory element or delay element which can delay the density data 103 one-line period. Based on the selected absolute white level data and absolute black level data 858, the second comparison gate circuit 859 samples the density data 861 of the pixels of the corresponding density range in the same manner as the window comparator 693 in the above embodiment does (see FIG. 32). For this purpose, the second comparison gate circuit 859 is also supplied with the timing clock 853 from the timing circuit 851.

With the main part of the density detection unit 840 constituted in the above manner, in the first modification, one scanning line data is processed by the first comparison gate circuit 841, and the density range for surface color removal suitable for that scanning line is determined. Based on that determination, the second comparison gate circuit 859 samples the density data 861 of the pixels of the corresponding density range. Density data 863 obtained by the sampling is supplied from the second comparison gate circuit 859 to circuit parts having the same constitution as those provided after the window comparator 693 of FIG. 32, which perform the density data averaging operation. The surface reference density 605 (see FIG. 35, for instance) is calculated by adding the offset to the average thus determined.

As described above, since in the digital copier of the first modification, the proper density range is set on a scanning line basis, the surface color density 605 suitable for each position can be set even in the case of a document having a large density variation in the sub-scanning direction. Therefore, there can be prevented such problems that a surface portion is output as an image portion and, conversely, an image portion such as a character disappears in the process of the density data averaging operation. It becomes possible to reproduce high-quality images.

Second Modification of the Invention

Figure 45:
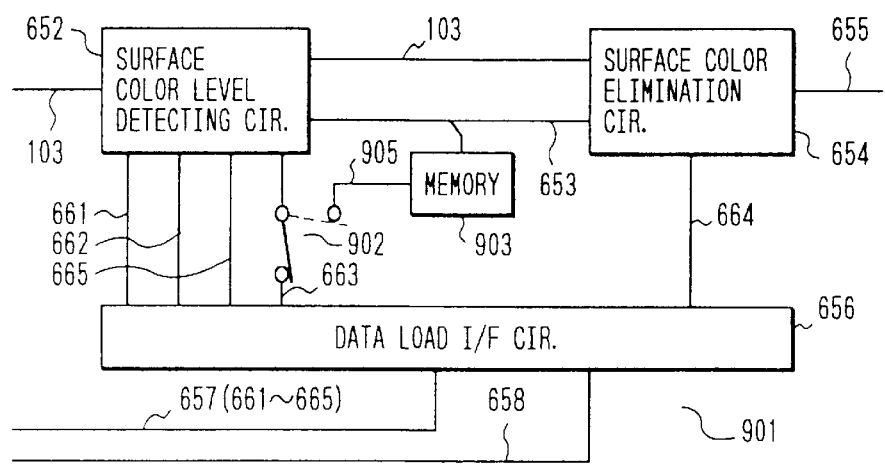
FIG. 45 is a block diagram showing constitution of a surface color removal portion of the digital copier of the second modification of the invention.

FIG. 45 shows a circuit configuration of a surface color removal portion 901 of a digital copier according to a second embodiment of the invention. The surface color removal portion 901 corresponding to the surface color removal portion 651 of the above-described embodiment (see FIG. 29). Therefore, the same parts as in FIG. 29 are represented by the same reference numerals and descriptions therefor are omitted where appropriate.

In the surface color removal portion 901 of the second modification, the initial elimination level data 663 output from a data load interface circuit 656 is input to a surface color level detection circuit 652 via a switch 902. The detection surface color level 653 output from the surface color level detection circuit 652 is supplied not only to a surface color elimination circuit 654 but also to a memory 903. The detection surface color level 652 stored in the memory 903 is applied to a contact of the switch 902. The switch 902 supplies the initial elimination level data 663 to the surface color level detection circuit 652, when density data of four pixels have not yet been found in the predetermined density range in the surface color detecting operation for the beginning portion of a scanning line in the surface color level detection circuit 652 and density data 905 to be referred to of the preceding scanning line is not stored in the memory 903. In the other case, the density data 905 output from the memory 903 is input to the surface color level detection circuit 652.

That is, in the surface color removal portion 901 of this modification, when density data of four pixels of the predetermined density range have not yet been sampled for the averaging operation as in the case of the beginning portion of the first line (reading start line) of a document, the initial elimination level data 663 is used for calculation of the detection surface color level 653 as in the case of the above-described embodiment. On the other hand, when the density data 905 of the preceding scanning line 905 can be available as in the case of the second scanning onward, the density data 905 is used instead of the initial elimination level data 663 at the beginning portion of the scanning line.

This constitution can provide the following advantage. For example, where the image data is divided into a plurality of blocks $b_1$–$b_6$ in the main scanning direction and the processing on one scanning line is performed independently for the respective blocks, there can be avoided such a problem that a difference appears in an image in a boundary between the adjacent blocks. That is, by using the data of the previous scanning line having the density similar to that of the current scanning line, there can be avoided such a case that an image portion such as a character disappears or a surface portion is output in the portion using the initial elimination level when the initial elimination level represented by the initial elimination level data 663 is too high or too low for the current document 306 (see FIG. 15).

Since the data load interface circuit 656 of the surface color elimination portion 901 of the second modification has the same constitution as that shown in FIG. 30, a description therefor is omitted here.

Figure 46:
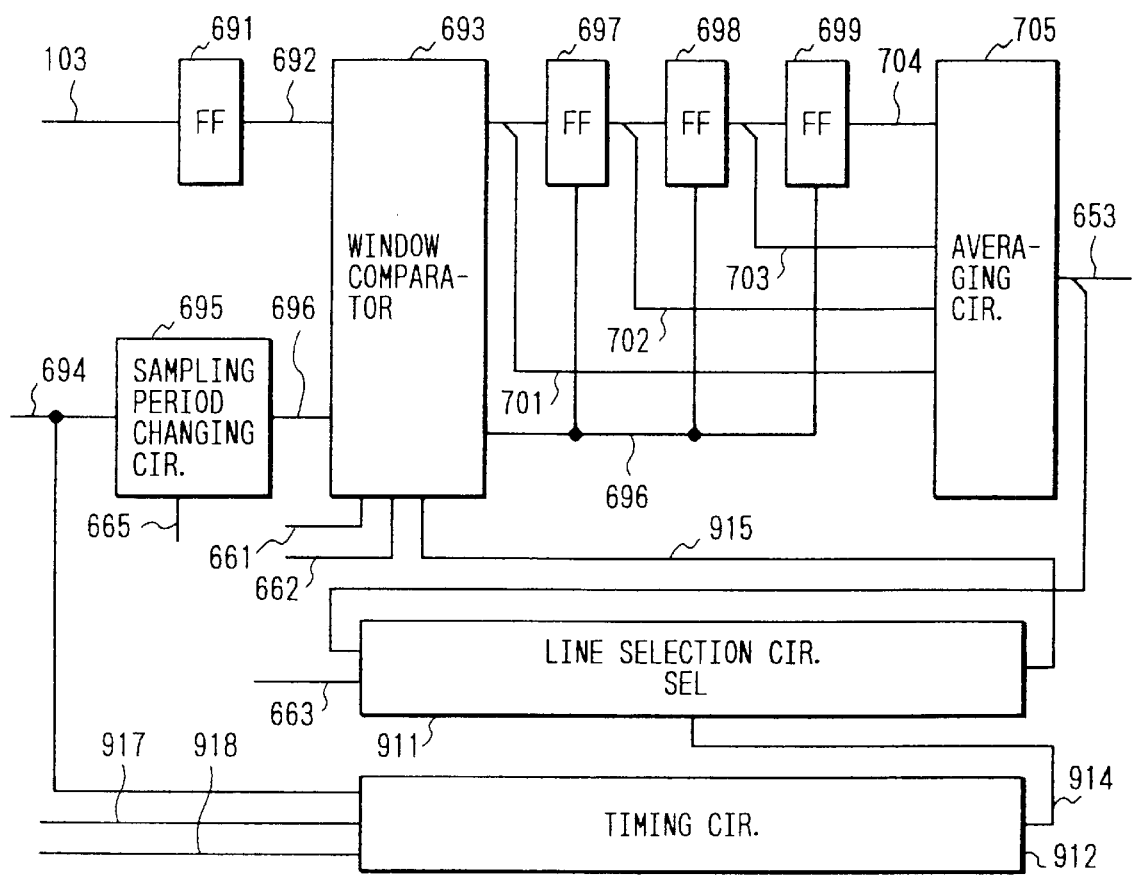
FIG. 46 is a block diagram showing specific constitution of the surface color removal portion of the second modification from which the surface color elimination circuit is removed.

FIG. 46 shows details of the surface color removal portion 901 except the surface color elimination circuit 654. If a line selection circuit 911 and a timing circuit 912 are removed, the circuit of FIG. 46 becomes basically the same as the surface color level detection circuit 652. Receiving the initial elimination level data 663 and the detection surface color level 653 output from an averaging circuit 705, the line selection circuit 911 stores those data of one scanning line in a first-in first-out manner, and supplies, as initial elimination level data 915, one of those data to a window comparator 693 in accordance with a selection signal 914 input to the line selection circuit 911 at its selection terminal SEL.

The timing circuit 912 receives a page sync signal 917, a line sync signal 918 and the video clock signal 694. By performing a logical operation on those signals, the timing circuit 912 generates the selection signal 914 for use in selecting the initial elimination level data 663 during the period from the head pixel to the predetermined pixel of the first scanning line at the start of the recording. Where the selection signal is to be output over the entire first scanning line at the start of the recording, it is not necessary to supply the video clock signal to the timing circuit 912.

In the surface color removal portion 901 having the above constitution, when the head of a page is detected by the page sync signal 917 and the head of the first scanning line is detected by the line sync signal 918, the line selection circuit 911 selects the initial elimination level data 663. Before this time point, the line selection circuit 911 has stored the initial elimination level data 663. Thus, the window comparator 693 outputs the density data 701 using the initial elimination level data 663 until density data of four pixels are obtained from the density data 692 to enable the averaging operation. The detection surface color level 653 output from the averaging circuit 705 is sent to the following circuits to effect the surface color removal, and also input to the line selection circuit 911 and stored therein sequentially.

The line selection circuit 911 is a kind of FIFO memory. When the detection surface color level 653 is selected by the selection signal 914 at the beginning portion of the new line, the detection surface color level at the beginning position of the previous scanning line is output from the line selection circuit 911 as the initial elimination level data 915 and input to the window comparator 693. The window comparator 693 outputs the density data 701 using the initial elimination level data 915 until density data of four pixels are obtained from the density data 692 to enable the averaging operation. In the similar manner, at the beginning portion of each of the following scanning lines, the density data 653 of the preceding scanning line is used as the initial elimination level data 915 instead of the fixed initial elimination level data 663.

Third Modification of the Invention

Figure 47:
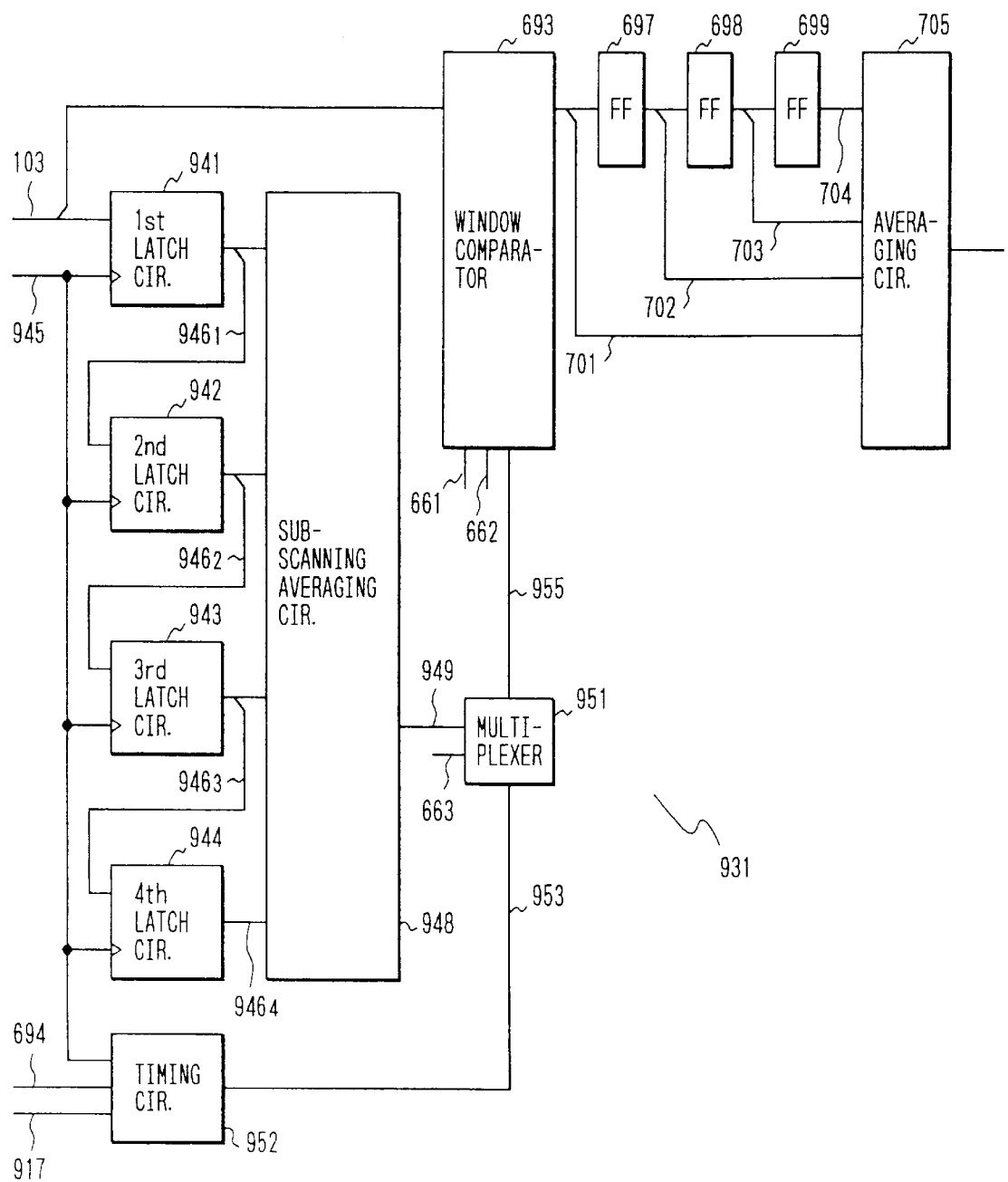
FIG. 47 is a block diagram showing the main part of a surface color removal portion of the digital copier of the third modification of the invention.

FIG. 47 shows the main part of a surface color removal portion 931 of a digital copier according to a third modification of the invention. The general constitution of the surface color removal portion 931 is the same as the surface color removal portion 651 of FIG. 29, and the data load interface circuit 656 has the constitution of FIG. 30. Therefore, descriptions therefor are omitted here.

In the third modification, the density data 103 is supplied not only to the window comparator 693 but to a first latch circuit 941. First to fourth latch circuits 941–944 are connected in series, and a line sync signal 945 is input to latch signal input terminals of the respective latch circuits 941–944. With this constitution, at the head of each scanning line, the first to fourth latch circuits 941–944 latch, at the same time, density data $946_1$–$946_4$ of four scanning lines arranged in the sub-scanning direction.

The density data $946_1$–$946_4$ are input to a sub-scanning averaging circuit 948, which calculates their average. Sub-scanning average density data 949 thus obtained serves as one of the inputs of a multiplexer 951, which also receives the fixed initial elimination level data 663. One of the two inputs is selected by a selection signal 953 supplied from a timing circuit 952, and forwarded to the window comparator 693 as initial elimination level data 955. In addition to the initial elimination level data 955, the window comparator 693 receives the absolute white level data 661, absolute black level data 662 and the density data 103.

In addition to the line sync signal 945, the timing circuit 952 receives the video clock signal 694 and the page sync signal 917. Since the circuits downstream of the window comparator 693 are the same as those already described above, no descriptions therefor are provided here.

The surface color removal portion 931 having the above constitution is suitable for the image processing where the image data is divided into a plurality of blocks in the main scanning direction (see FIG. 15, for instance). As mentioned above, in this type of image processing, there might occur such a problem that a surface portion appears as an image portion or an image portion becomes very faint at a boundary of the adjacent blocks, if the initial elimination level data 663 at the head position of each divided line were not appropriate. In the third modification, the density data 945 is latched in the first to fourth latch circuits 941–944 at the head position of the scanning line of each divided block. Based on those density data 945, the average density of the pixels in the sub-scanning direction is calculated and supplied to the multiplexer 951 as the sub-scanning average density data 949. The multiplexer 951 selects this data, and forwards it to the window comparator 693 as the initial elimination level data 955. Thus, the initial elimination level at the beginning portion of each scanning line is made an appropriate one.

In the first several lines before the sub-scanning average density data 949 is obtained in the above manner, the selection signal 953 is so controlled that the timing circuit 952 selects the initial elimination level data 663 at the beginning portions of those lines. Usually, since the head of a document is a margin area, the use of the fixed initial elimination level data 663 in the first several lines will not cause any problem. Further, in the sub-scanning averaging circuit 948 of the surface color elimination portion 931 the scanning lines for the averaging operation are sequentially moved in the sub-scanning direction as the processing proceeds in the sub-scanning direction. Therefore, the surface color removal operation can be performed in accordance with the density distribution in the sub-scanning direction.

As described above, according to the invention, pixels whose densities are within the predetermined range are extracted as the surface color detection pixels, and part of those pixels are sampled for the calculation of the surface reference density, in which the sampling period can be adjusted externally. As a result, the response speed to the density data variation can be adjusted, so that the surface density can be determined in accordance with the state of a document. The omission of image information can be prevented while a clear surface is produced. Further, since there exists only one density range setting means, there can be obtained great practical advantages with simple circuit constitution.

According to another aspect of the invention, the density range setting means sets a plurality of pixel density ranges, and pixels on a document having densities within the respective ranges are counted for the respective ranges. Since, in usual documents, surface portions occupy a larger area than character portions etc., the density range associated with the maximum count in the counting means is employed as the density range for actual use. That is, the surface reference density of a document is obtained by sampling the surface color detection pixels whose densities are within the range thus determined, averaging the sampled densities and adding the offset to the average density. Pixels whose densities are lower than the surface reference density thus determined are regarded as surface pixels, and their density data are fixed to the preset surface density. As a result, with the selection of the proper density range, the surface reference density can be obtained properly for various types of documents. The automatic image processing apparatus can be provided.

Since the density range associated with the maximum count in each scanning line is employed as the density range for actual use, the surface color level processing can be performed in accordance with the image state of a document in the sub-scanning direction.

Further, when the average of the density data cannot be obtained, the preset initial value is used, the density data of the preceding scanning line is used, or the density data of the same position in the main scanning direction on previous scanning lines are taken into account. Therefore, even where the image data is divided into a plurality of blocks in the main scanning direction, problems such as disappearance of an image portion and erroneously surface portion at a boundary between the adjacent blocks are avoided.

What is claimed is:

1. An image processing apparatus comprising:

means for reading a document to produce serial density data of a plurality of pixels of the document while performing main line scanning and sub-scanning:

means for setting a density range without computing an average of pixels to be extracted for surface color detection;

means for determining a surface reference density of a first extracted pixel from an average of densities of a first plurality of pixels which are located in the vicinity of the first extracted pixel and which have densities within the density range, wherein the first plurality of pixels excludes pixels which are outside of the set density range, the first extracted pixel and the first plurality of pixels being selected based on the main line scanning and sub-scanning, said means for determining a surface reference density having a shift register means for serially receiving density data of the first plurality of pixels and outputting the density data in parallel, and an averaging means for receiving the density data outputted in parallel from the shift register means and calculating an average value of the density data outputted in parallel;

means for replacing a density of the first extracted pixel with a predetermined surface density if the density of the extracted pixel is lower than the surface reference density; and the shift register means of said surface reference density determining means shifting to a new extracted pixel for determining a surface reference density of the new extracted pixel from another plurality of pixels which are located in the vicinity of the new extracted pixel and which include at least some of the pixels included in the first plurality of pixels.

2. The image processing apparatus of claim 1, further comprising means for setting a period of sampling the plurality of pixels for determination of the surface reference density.

3. The image processing apparatus of claim 2, wherein the sampling period is adjustable.

4. The image processing apparatus of claim 3, wherein the first surface reference density determined in a particular scanning line is employed as a surface reference density for scanning lines after the particular scanning line.

5. The image processing apparatus of claim 3, further comprising:

means for storing a surface reference density of a head pixel of a particular scanning line; and means for providing the stored surface reference data as density data of the plurality of pixels to said means for determining surface reference density when a surface reference data of a head pixel of a following scanning line is determined.

6. An image processing method comprising the steps of:

reading a document to produce serial density data of a plurality of pixels of the document while performing main line scanning and sub-scanning;

determining a surface reference density of a first extracted pixel from an average of densities of a first plurality of pixels which are located in the vicinity of the first extracted pixel and which have densities within a density range set without computing an average for surface color detection, wherein the first plurality of pixels excludes which are outside of the set density range, the first extracted pixel and the first plurality of pixels being selected based on the main line scanning and sub-scanning;

the step of determining a surface reference density including a substep of serially receiving density data of the first plurality of pixels and outputting the density data in parallel, and a substep of receiving density data outputted in parallel and calculating an average value of the density data outputted in parallel;

replacing a density of the first extracted pixel with a predetermined surface density if the density of the first extracted pixel is lower than the surface reference density; and the surface reference density determining and density replacing steps being repeated to determine a surface reference density for a new extracted pixel for determining a surface reference density of the new extracted pixel from another plurality of pixels which are located in the vicinity of the new extracted pixel and which include at least some of the pixels included in the first plurality of pixels.

7. The image processing method of claim 6, the step of determining the surface reference density comprises sampling the plurality of pixels for determination of the surface reference density at a predetermined sampling period.

8. The image processing method of claim 7, wherein the sampling period is adjustable.

9. The image processing method of claim 8, wherein the first surface reference density determined in a particular scanning line is employed as a surface reference density for scanning lines after the particular scanning line.

* * * * *